United States Patent
Akiyama et al.

(10) Patent No.: US 7,645,536 B2
(45) Date of Patent: Jan. 12, 2010

(54) FUEL CELL, FUEL CARTRIDGE AND FUEL CELL SYSTEM

(75) Inventors: Eiji Akiyama, Tokyo (JP); Yoshimi Kubo, Tokyo (JP); Tsutomu Yoshitake, Tokyo (JP); Takashi Manako, Tokyo (JP); Hiroshi Kajitani, Tokyo (JP); Hidekazu Kimura, Tokyo (JP); Satoshi Nagao, Tokyo (JP); Yoshinori Watanabe, Tokyo (JP); Yasutaka Kono, Tokyo (JP)

(73) Assignee: NEC Corporation, Tokyo (JP)

( * ) Notice: Subject to any disclaimer, the term of this patent is extended or adjusted under 35 U.S.C. 154(b) by 285 days.

(21) Appl. No.: 10/582,666

(22) PCT Filed: Nov. 18, 2004

(86) PCT No.: PCT/JP2004/017157

§ 371 (c)(1),
(2), (4) Date: Aug. 14, 2006

(87) PCT Pub. No.: WO2005/057703

PCT Pub. Date: Jun. 23, 2005

(65) Prior Publication Data
US 2007/0166595 A1    Jul. 19, 2007

(30) Foreign Application Priority Data
Dec. 12, 2003   (JP)   ............... 2003-415543

(51) Int. Cl.
*H01M 2/00*  (2006.01)
*H01M 8/04*  (2006.01)
*B65D 85/00* (2006.01)
*B65D 83/00* (2006.01)
*B65D 8/00*  (2006.01)
*B65D 88/54* (2006.01)

(52) U.S. Cl. .............. 429/34; 429/22; 429/35; 206/7; 137/255; 137/260; 137/614; 220/4.12; 222/325

(58) Field of Classification Search ............. 429/12–13, 429/22, 34, 90, 96, 35; 423/658.2; 206/0.7; 137/255–258, 614; 220/4.12; 222/325
See application file for complete search history.

(56) References Cited

U.S. PATENT DOCUMENTS

| | | | |
|---|---|---|---|
| 2002/0187374 A1* | 12/2002 | Yamauchi et al. | 429/22 |
| 2003/0082416 A1 | 5/2003 | Bullock et al. | |
| 2005/0079128 A1* | 4/2005 | deVos et al. | 423/658.2 |
| 2005/0260465 A1* | 11/2005 | Harris | 429/13 |

FOREIGN PATENT DOCUMENTS

| | | |
|---|---|---|
| JP | 2003-045468 | 2/2003 |
| JP | 2003-092128 | 3/2003 |
| JP | 2003-142137 | 5/2003 |
| JP | 2004-071262 | 3/2004 |
| JP | 2004-152741 | 5/2004 |
| JP | 2004-349087 | 12/2004 |

* cited by examiner

Primary Examiner—Jennifer K Michener
Assistant Examiner—Claire L Rademaker
(74) Attorney, Agent, or Firm—Young & Thompson

(57) ABSTRACT

A fuel cell (100) is mounted with a fuel cartridge (1220) in a detachable manner. The fuel cartridge (1220) is provided with a connecting part (1225) and the fuel cell (100) is provided with a fitting part (1205) into which the connecting part (1225) is fitted. The fuel cell (100) identifies the fitted fuel cartridge (1220).

19 Claims, 31 Drawing Sheets

FIG. 5
(A) 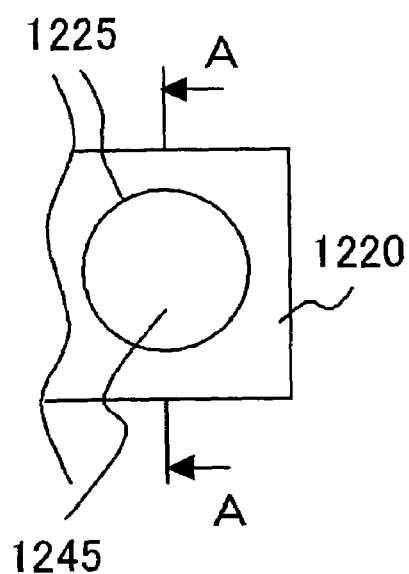
(B) 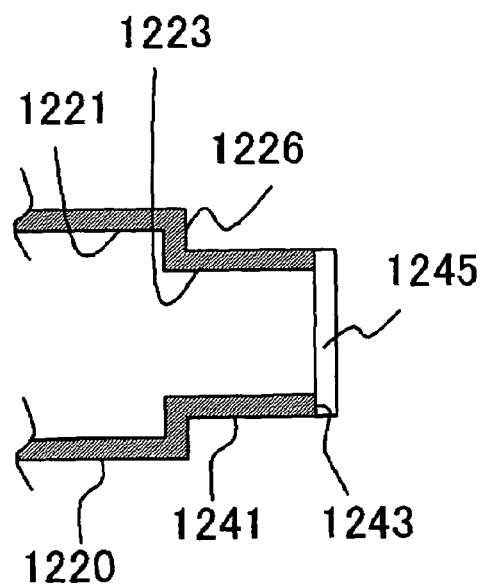
(C) 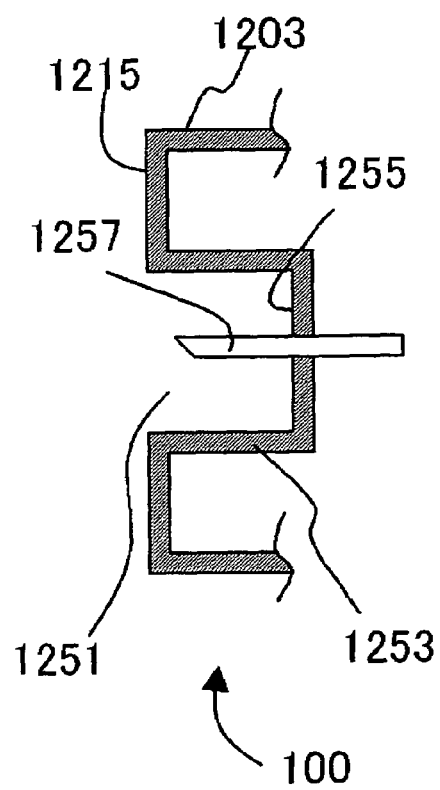
(D) 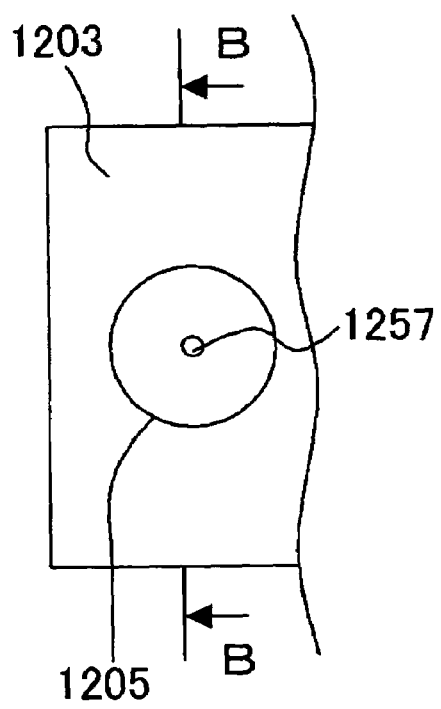

FIG. 7
(A)
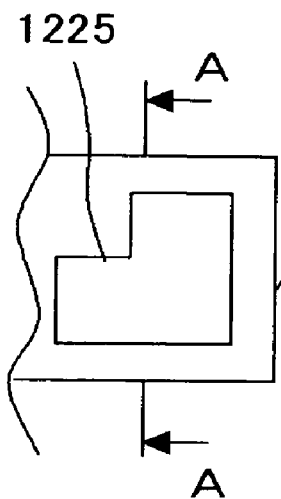
(B)
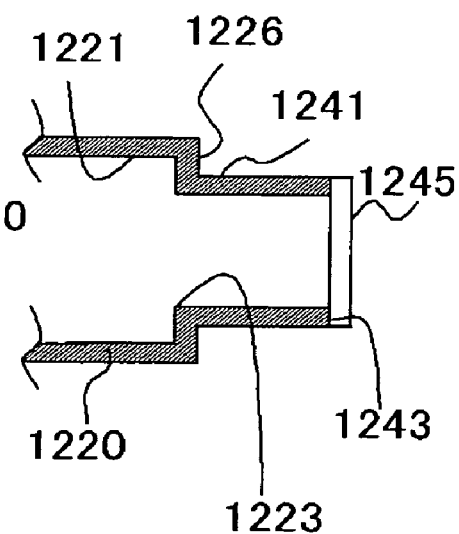
(C)
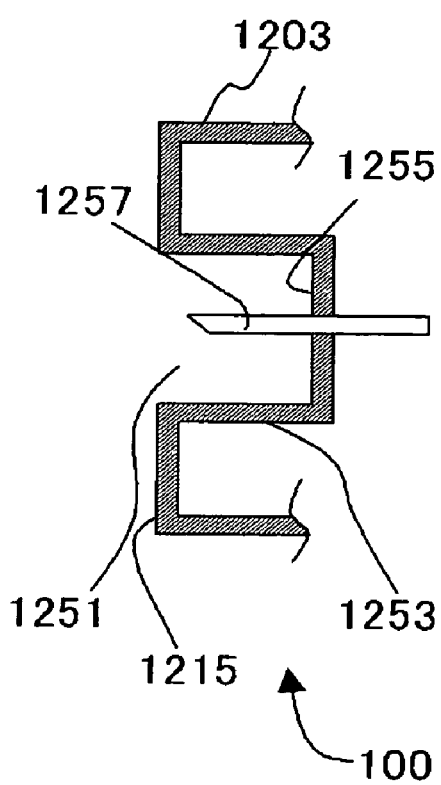
(D)
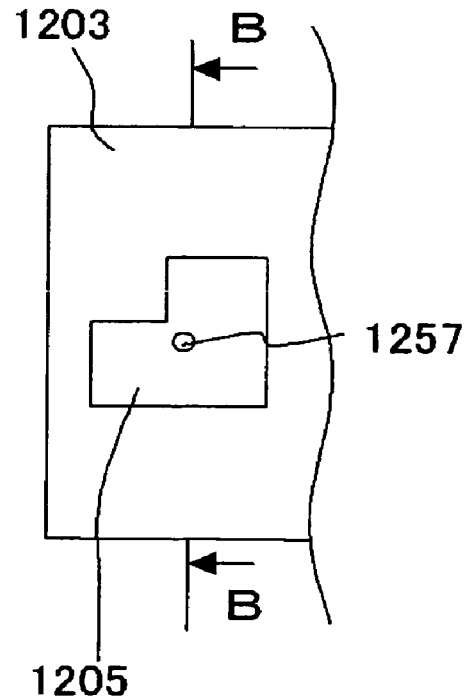

FIG. 16
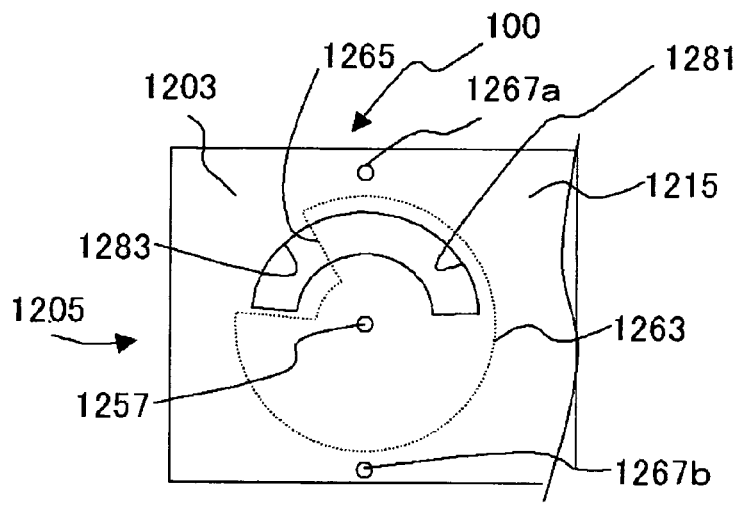
(A)
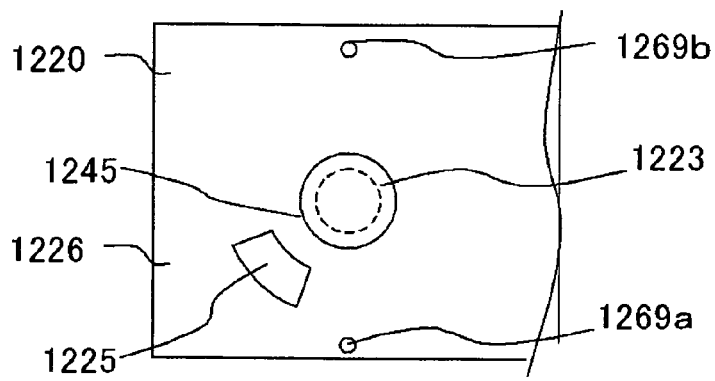
(B)
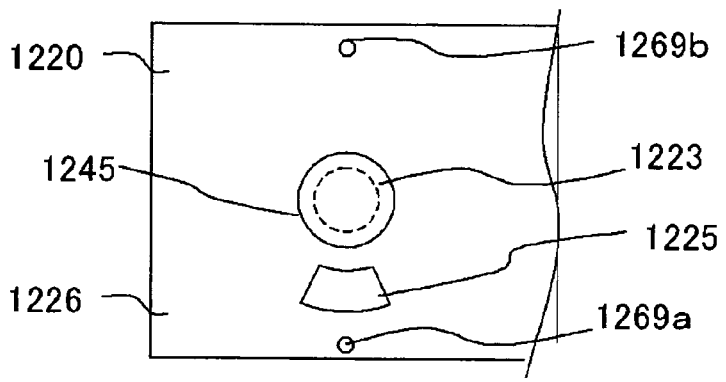
(C)
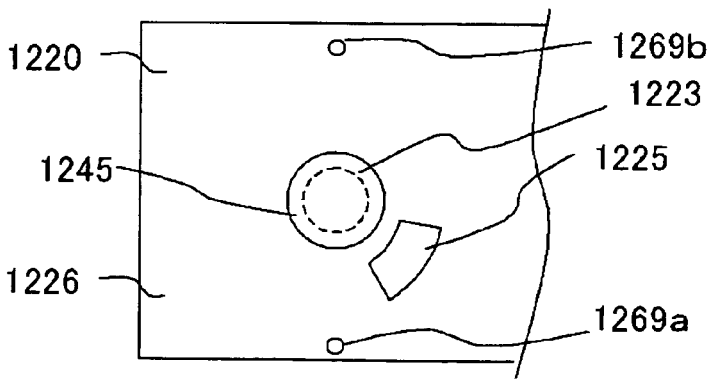
(D)

FIG. 30
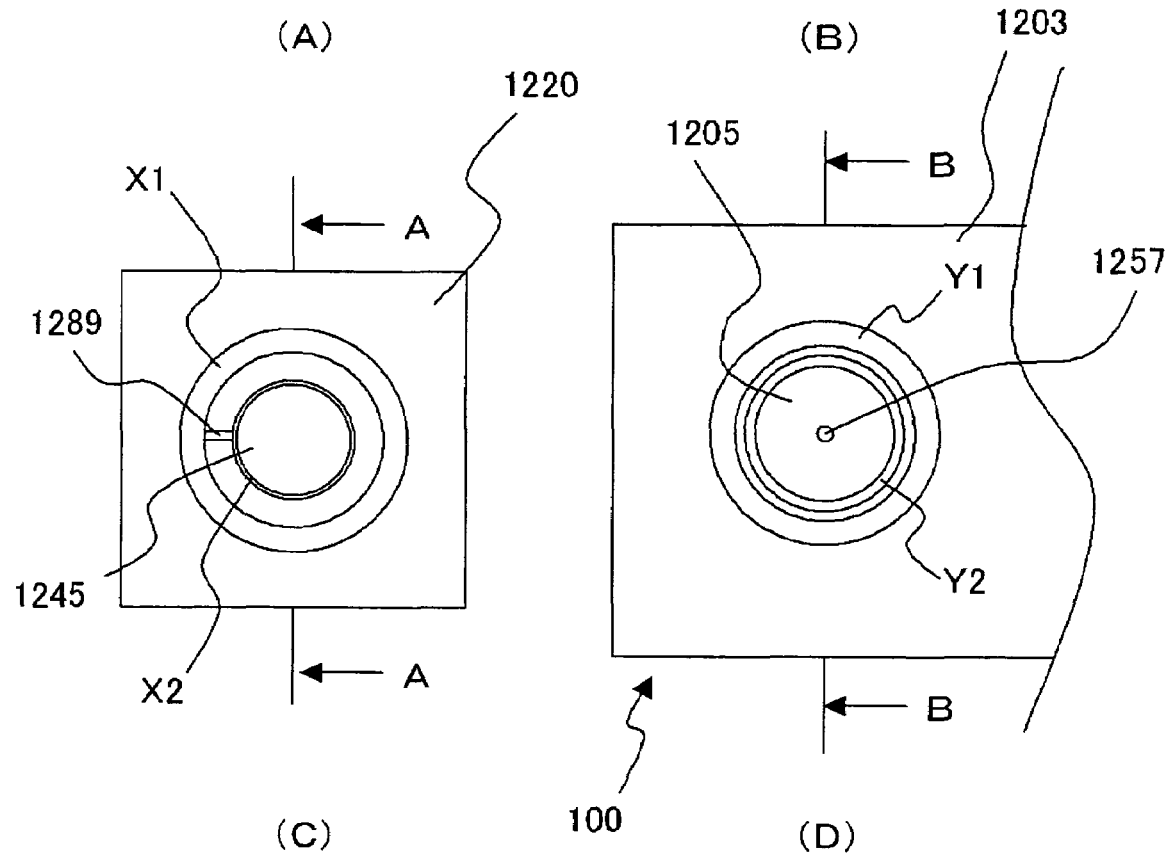
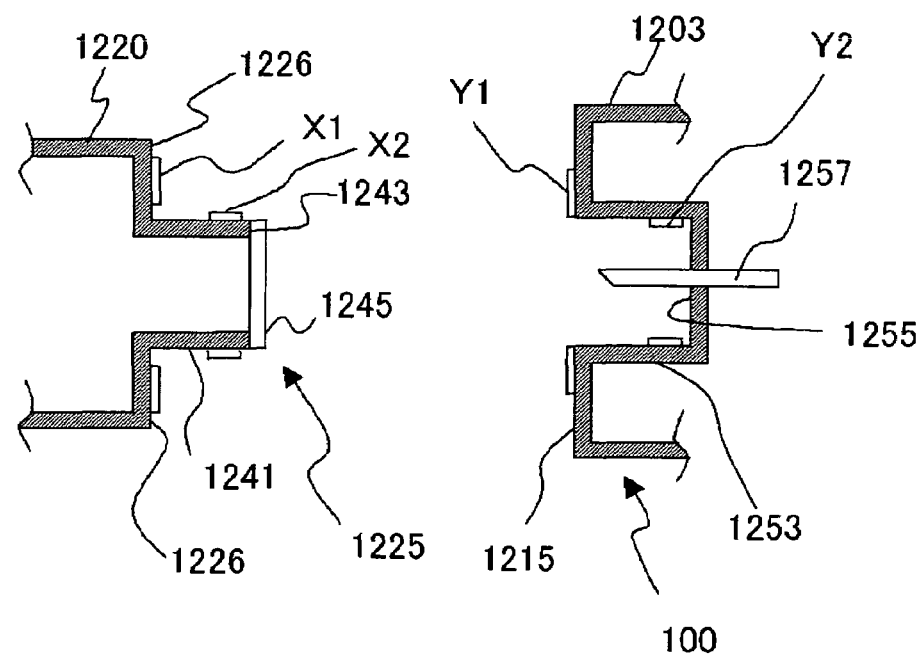

FUEL CELL, FUEL CARTRIDGE AND FUEL CELL SYSTEM

TECHNICAL FIELD

The present invention relates to a fuel cell, a fuel cartridge to be mounted on the fuel cell and a fuel cell system including them.

BACKGROUND ART

A fuel cells is comprised of a fuel electrode, an oxidant electrode and an electrolyte interposed between these electrodes, wherein fuel is supplied to the fuel electrode and an oxidizer is supplied to the oxidant electrode, to generate electricity by an electrochemical reaction of the fuel. Hydrogen is generally used as the fuel. In the meantime, a direct fuel cell that directly utilizes inexpensive and easily handlable methanol as the fuel has been enthusiastically developed in recent years.

When hydrogen is used as the fuel, the reaction at the fuel electrode is as shown in the following equation (1).

$$3H_2 \rightarrow 6H^+ + 6e^- \tag{1}$$

When methanol is used as the fuel, the reaction at the fuel electrode is as shown in the following equation (2).

$$CH_3OH + H_2O \rightarrow 6H^+ + CO_2 + 6e^- \tag{2}$$

In all these cases, the reaction at the oxidant electrode is as shown in the following equation (3).

$$3/2 O_2 + 6H^+ + 6e^- \rightarrow 3H_2O \tag{3}$$

Patent Document 1 discloses a fuel cartridge that supplies fuel to a fuel cell when the fuel cell is used as a power source for a portable electric device.

[Patent Document 1] Japanese Laid-open patent publication No. 2003-92128.

DISCLOSURE OF THE INVENTION

In this manner, fuel cartridges constituted in an interchangeable manner on a fuel cell have come to be used. However, it is considered that various fuels such as fuels having different concentrations are used depending on operational situations and working places. It is supposed that various fuel cartridges filled with various fuels having different in concentration and type will be prepared. In such a case, it is necessary to select an adequate fuel cartridge from various fuel cartridges and to fit it to the fuel cell. Also, in the case of using organic liquid fuel such as methanol, it is considered that the use of this fuel is limited by its working place.

The present invention has been made in view of the above situation and it is an object of the present invention to provide technologies for fitting a fuel cartridge filled with an adequate fuel to a fuel cell in a simple structure and constitution.

According to the present invention, there is provided a fuel cell including a mounting part where a fuel cartridge filled with fuel is mounted in a detachable manner and an identification part that identifies the fuel cartridge to be mounted on the mounting part.

According to this construction, an inadequate fuel cartridge can be prevented from being mounted on the fuel cell since it can be discriminated whether an adequate fuel cartridge is mounted or not. This makes it possible to secure, for example, safety when the fuel cell is used.

In the fuel cell of the present invention, the identification part may include the fitting part that is selectively fitted into the fuel cartridge. Such a structure can prevent a fuel cartridge from being mounted on the fuel cell into which the fuel cartridge is not fitted.

In the fuel cell of the present invention, the identification part may include plurality of fitting parts and a selecting part that makes usable one fitting part to be selectively fitted into a specified fuel cartridge among these fitting parts. The selecting part may be, for example, a shutter that opens only one fitting part among these plurality of fitting parts and covers other fitting parts. The fitting part has a different shape or configuration corresponding to the type of fuel cartridge. Such a structure ensures that an any fitting part can be selected on the fuel cell side and it is therefore possible to mount an adequate fuel cartridge on the fuel cell depending on the environment and situation where the fuel cell is used.

The fuel cell of the present invention may further includes a detecting unit that detects whether the fitting part is fitted into a fuel cartridge or not, wherein the fuel cell can work when the detecting unit detects that the fitting part is fitted into the fuel cartridge. The detecting unit may serves as a sensor that detects whether or not the lid of a receiver that receives the fuel cartridge is closed or as a unit that detects electrical connection.

In the fuel cell of the present invention, the identification part may include a terminal which is connected with the fuel cartridge selectively and electrically.

In the fuel cell of the present invention, the identification part may include plurality of terminals and a selecting part that selects one terminal connected electrically to a specified fuel cartridge from these terminals.

The fuel cell may further include a detecting unit that detects the electrical connecting condition between a fuel cartridge and the terminal of the identification part, wherein the selecting part may serve as a switch that electrically connects any one of the plurality of terminals with the detecting unit.

The fuel cell of the present invention may further include a detecting unit that detects whether or not the terminal is electrically connected with the fuel cartridge, wherein the fuel cell can work when the detecting unit detects that the terminal is connected with the fuel cartridge.

In the fuel cell of the present invention, the identification part may include plurality of terminals and a detecting unit that detects the electrical connecting condition between these plurality of terminals and the fuel cartridge mounted on the mounting part.

In the fuel cell of the present invention, the identification part may further include a judging part that judges the type of fuel filled in the fuel cartridge based on the electrical connecting condition between these plurality of terminals and the fuel cartridge, and a control unit that controls the operation condition depending on the type of fuel judged by the judging part.

According to the present invention, there is provided a fuel cartridge including a labeled part that can be identified by the identification part of the above fuel cell. The labeled part may serve as a connecting part that fits to the fitting part of the fuel cell or as a terminal which is connected electrically with the terminal of the fuel cell.

According to the present invention, there is provided a fuel cartridge including a labeled part that can be identified by the identification part of the fuel cell, the fuel cartridge further including plurality of terminals and a selecting part that selects one terminal connected electrically to the terminal of the fuel cell from these terminals.

According to the present invention, there is provided a fuel cell system including a fuel cartridge having a labeled part indicating a fuel to be filled and a fuel cell body having an identification part that identifies the labeled part of the fuel cartridge.

According to the present invention, there is provided a fuel cell system including the fuel cell and a receiving unit that receives information of the regulation as to the use of the fuel. Also, an outputting part of the fuel cell system can output the use regulation information. Moreover, the control unit of the fuel cell can control the action of the fuel cell based on the fuel-judgment result obtained by the fuel judging part and the use regulation information received by the receiving unit. Also, the switching part may switch the identification part of the fuel cell based on the use regulation information received by the receiving unit.

Also, this fuel cell system may include a transmitter for transmitting the use regulation information. Furthermore, in this fuel cell system, the receiving unit and/or the transmitter can transmit and receive the use regulation information by radio communication.

According to this construction, an adequate fuel can be used in accordance with the working environment even in the situation where the use of the fuel is regulated, which makes it possible to improve safety.

According to the present invention as mentioned above, the fuel cell is provided with the identification part that identifies a fuel cartridge to be mounted and therefore, a fuel cartridge filled with adequate fuel can be fitted into the fuel cell in a simple structure and constitution.

BRIEF DESCRIPTION OF THE DRAWINGS

The objects described above, other objects, the characteristics and advantages of the invention will be more apparent with reference to the preferred embodiments described below and the following drawing associated therewith.

FIG. 5 is a view showing the connecting part of a fuel cartridge and a fitting part of a fuel cell having a shape fitted into the fuel cartridge connecting part.

FIG. 7 is a view showing the connecting part of a fuel cartridge and a fitting part of a fuel cell having a shape fitted into the fuel cartridge connecting part.

FIG. 16 is a view typically showing another example of the connecting part of a fuel cartridge corresponding to the fitting part of a fuel cell in an embodiment of the present invention.

FIG. 30 is a view showing another example of a fuel cell and a fuel cartridge in an embodiment of the present invention.

BEST MODE FOR CARRYING OUT THE INVENTION

An embodiment of the present invention will be explained with reference to the drawings. In all the following drawings, the same structural elements are represented by the same numerals and the explanations of details of these elements will not be described appropriately in the following explanations.

A fuel cell in this embodiment of the present invention is applicable to small-sized electric devices such as portable telephones, notebook-type or other type portable personal computers, PDAs (Personal Digital Assistants), various types of cameras, navigation systems and portable music reproduction players. Also, the fuel cell uses an exchangeable fuel cartridge.

FIRST EMBODIMENT

In this embodiment, a fuel cartridge is provided with a connecting part corresponding to fuel to be filled and a fuel cell is provided with a fitting part that fits to the connecting part of the fuel cartridge to mount a proper fuel cartridge.

Figure 1:
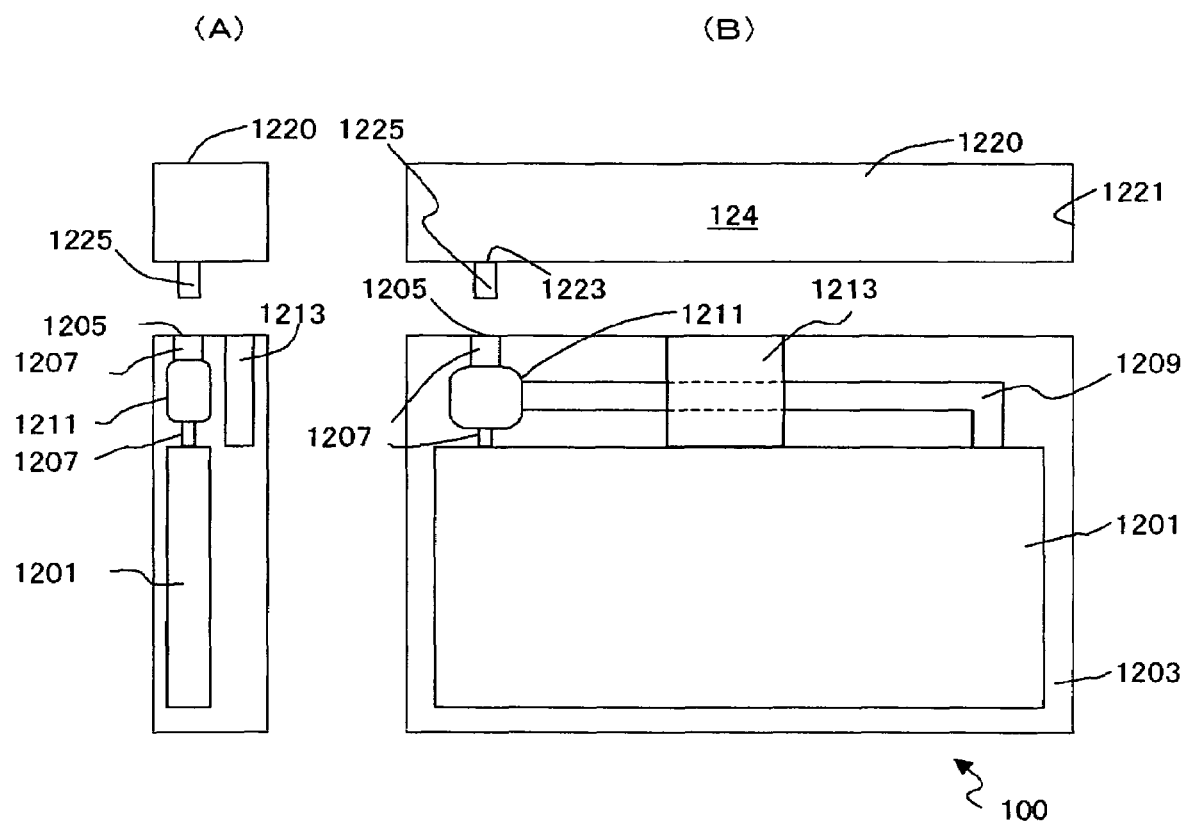
FIG. 1 is a view typically showing the structure of a fuel cell in an embodiment of the present invention.

FIG. 1 is a view typically showing the construction of the fuel cell in this embodiment. FIG. 1(A) is a side arrangement drawing and FIG. 1(B) is a front arrangement drawing.

A fuel cell 100 is provided with a cell stack 1201 and a casing 1203 that receives the cell stack 1201. A fuel cartridge 1220 that receives a fuel 124 is fitted to the fuel cell 100. The fuel cartridge 1220 includes a fuel chamber 1221 receiving the fuel 124, an injection port 1223 which is opened into the fuel chamber 1221 and from which the fuel 124 is injected into the fuel cell 100 and a connecting part 1225 having a shape corresponding to the fuel 124 to be filled. Here, the connecting part 1225 is integrated with the injection port 1223.

The fuel cell 100 includes a fitting part 1205, a fuel supplying passage 1207, a fuel circulating passage 1209, a pump 1211 and an exhaust fan 1213. The fitting part 1205 receives the fuel 124 from the injection port 1223 of the fuel cartridge 1220. Also, the fitting part 1205 is mounted with the fuel cartridge 1220 in a detachable manner and is fitted selectively into the connecting part 1225 of the fuel cartridge 1220. The fuel supplying passage 1207 supplies the fuel 124 to the cell stack 1201 from the fitting part 1205. The fuel circulating passage 1209 circulates the fuel 124 discharged from the cell stack 1201. The pump 1211 is disposed in the fuel supplying passage 1207, sucks the fuel 124 from the fuel cartridge 1220 and circulates the fuel 124 from the fuel circulating passage 1209. The exhaust fan 1213 emits moisture and reaction product gases in the casing 1203 from an exhaust port (not shown in the drawings) to the outside of the casing 1203.

The cell stack 1201 includes plurality of unit cells (not shown in the drawings) each having a solid electrolyte film (not shown in the drawings), and a fuel electrode (not shown in the drawings) and an oxidant electrode (not shown in the drawings) which are disposed facing each other and between which the solid electrolyte film is sandwiched. The fuel 124 supplied from the fuel cartridge 1220 is fed to the fuel electrode and air is fed as an oxidizer to the oxidant electrode. Alternatively, oxygen gas may be fed as the oxidizer.

In the fuel cell 100 of the present invention, for example, organic liquid fuels including methanol, ethanol, dimethyl ether or other alcohols or liquid hydrocarbons such as a cycloparaffin may be used as the fuel 124. The organic liquid fuels may be aqueous solutions.

Figure 2:
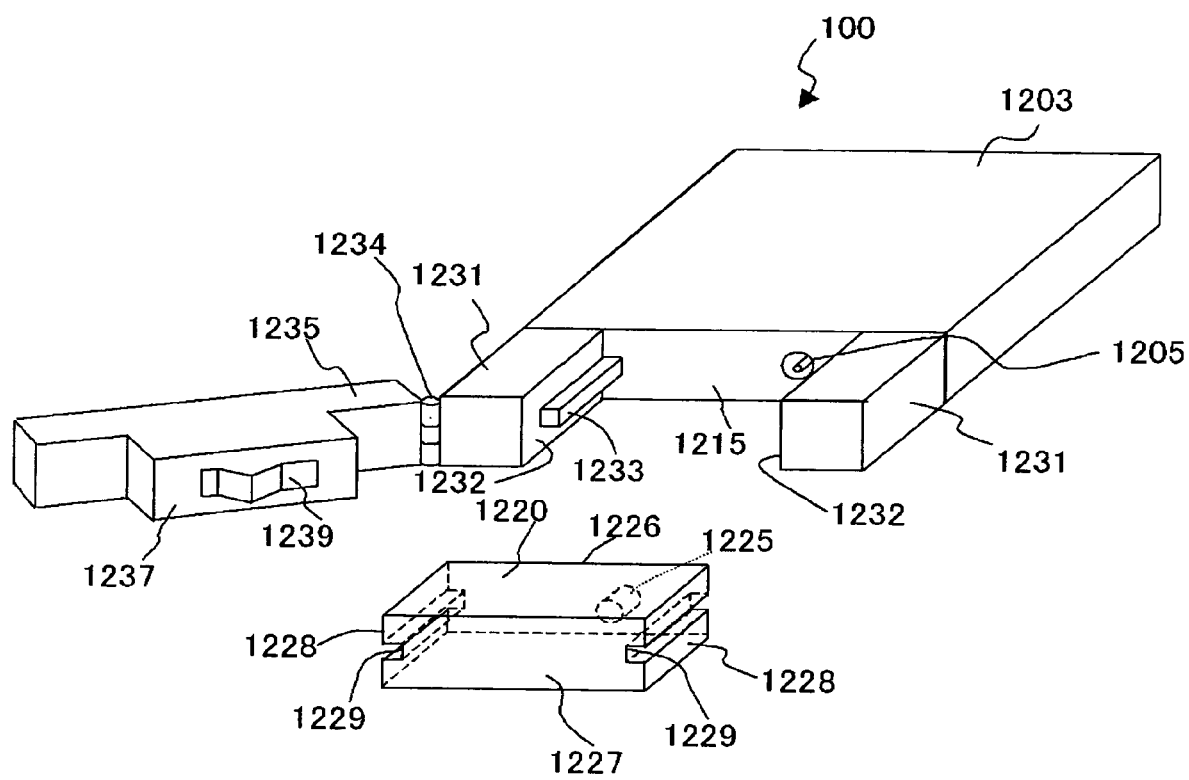
FIG. 2 is a perspective view showing one example of a cartridge fitting mechanism of the fuel cell shown in FIG. 1.
Figure 3:
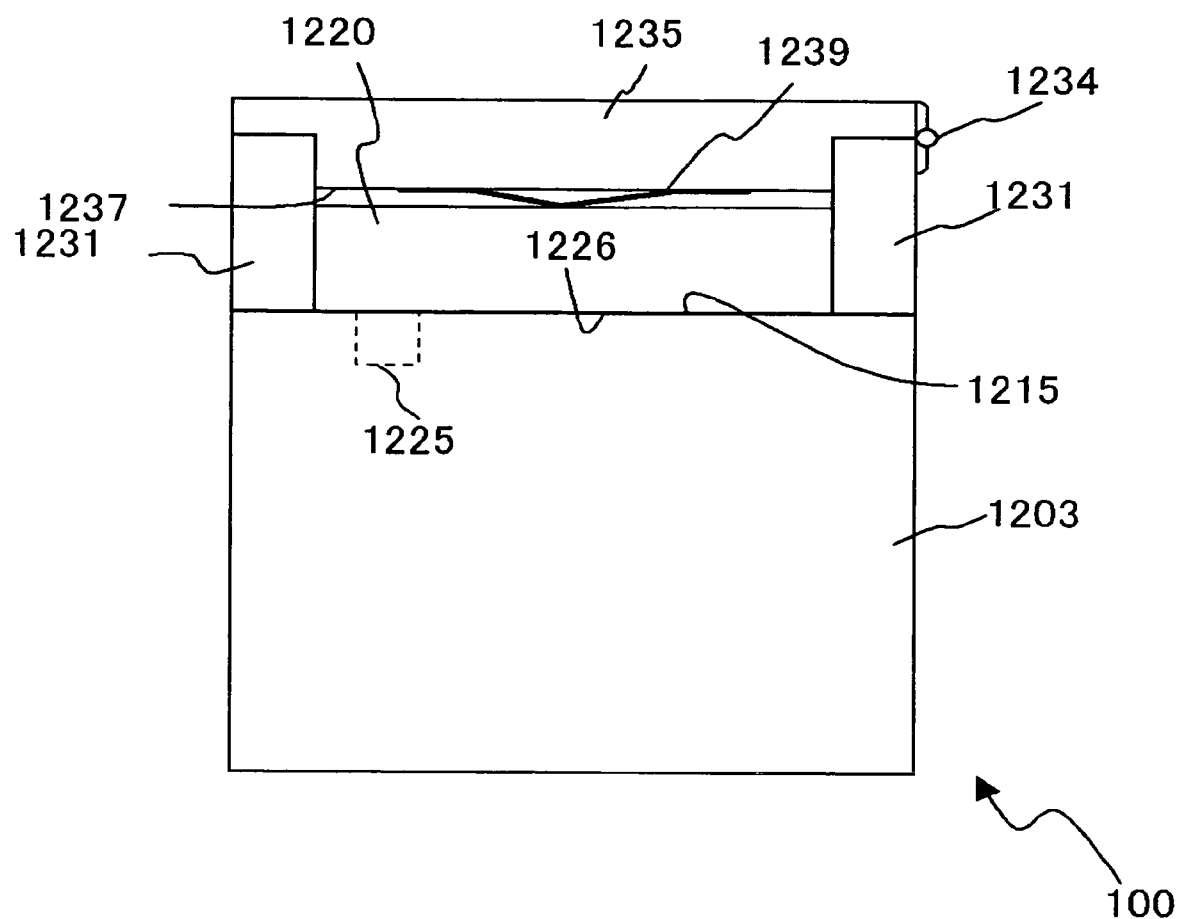
FIG. 3 is a front view showing the condition of the fuel cell of FIG. 2 to which a fuel cartridge is fitted.

FIG. 2 is a perspective view showing the fuel cell 100 and fuel cartridges 1220 shown in FIG. 1. Also, FIG. 3 is a front view showing the condition of the fuel cell 100 to which the fuel cartridge 1220 is fitted as shown in FIG. 2.

The fuel cell 100 is provided with a cartridge fitting mechanism that fits the fuel cartridge 1220 to the casing 1203 in a detachable manner. In this embodiment, the fuel cartridge 1220 is provided with a fitting plane 1226 on which the connecting part 1225 is disposed, a pressed plane 1227 disposed on the side opposite to the fitting plane 1226 and two sides 1228 in a lateral direction substantially vertical to the fitting plane 1226. Also, the fuel cartridge 1220 includes grooves 1229 which are respectively formed on both side surfaces 1228.

The casing 1203 of the fuel cell 100 is provided with a receiving plane 1215 which face to the fitting plane 1226 of the fuel cartridge 1220 when the fuel cartridge 1220 is mounted. The cartridge fitting mechanism includes a pair of guiding parts 1231 extending in a direction substantially vertical to the receiving plane 1215 of the casing 1203, rail parts 1233 which are disposed in the longitudinal direction of the two sides 1232 facing each other in the pair of guiding parts 1231 and respectively have a shape fitted into the groove 1229 of the fuel cartridge 1220, a lid 1235 disposed on one of the guiding parts in the manner that it is pivotal on a pin 1234 as the rotation axis, a press part 1239 that is made of an elastic member, projects inward of the lid 1235, is disposed on a plane 1237 facing the fuel cartridge 1220 and presses the pressed plane 1227 of the fuel cartridge 1220 against the casing 1203 side, and a fixing part (not shown in the drawings) that fixes the lid 1235 so as to put in a closed state on the side of the other guiding part 1231.

When the fuel cartridge 1220 is mounted on the fuel cell 100 structured in this manner, the fitting plane 1226 of the fuel cartridge 1220 is made to face the receiving plane 1215 of the casing 1203 to insert the groove 1229 of the fuel cartridge 1220 along the rail part 1233 of the guiding part 1231. In succession, the connecting part 1225 of the fuel cartridge 1220 is fitted into the fitting part 1205 of the casing 1203 and the lid 1235 is closed to fix the cartridge by the fixing part. By this process, the fuel cartridge 1220 is pressed against the casing 1203 by the press part 1239 disposed on the inside of the lid 1235 and fixed firmly to the casing 1203 as shown in FIG. 3.

Also, the fuel cell 100 may be configured to be provided with a detecting unit (not shown in the drawings) which detects that the fuel cartridge 1220 is mounted and the lid 1235 is closed, wherein the fuel cell 100 can be operated when the detecting unit detects that the lid 1235 is closed.

In the descriptions of the above example, the lid 1235 is turned around the pin 1234 as the center pivot and is closed, whereby the fuel cartridge 1220 is mounted. However, the method of mounting the fuel cartridge 1220 is not limited to this, but the fuel cartridge may be mounted using other methods including a system in which the fuel cartridge is united by hooking it by a craw or the like or by a slide lock system.

Figure 4:
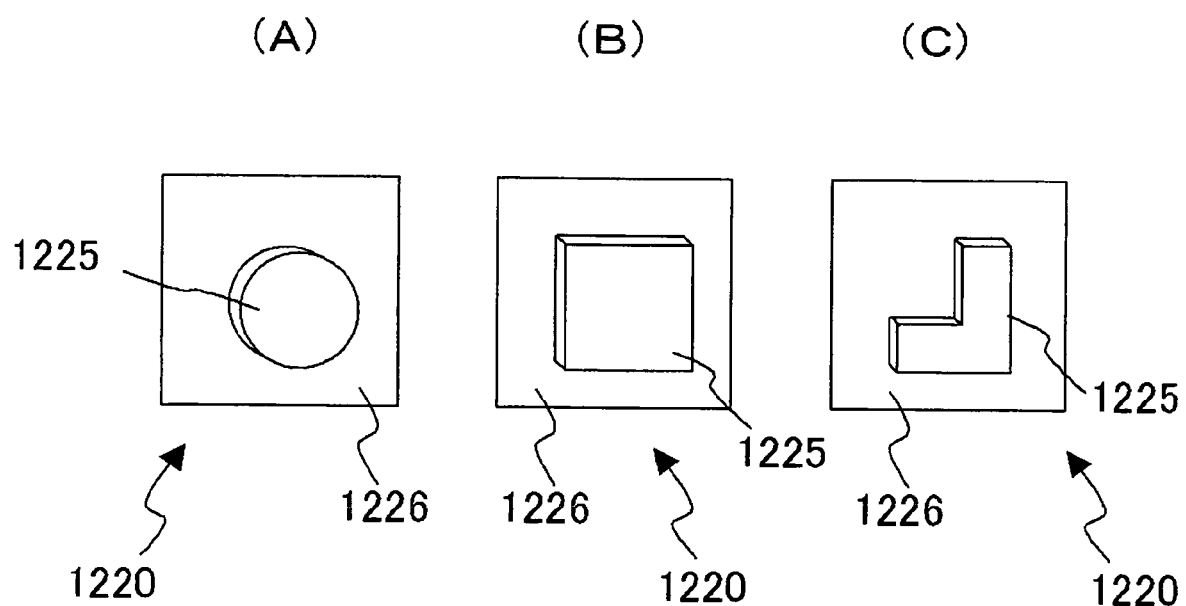
FIG. 4 is a perspective view showing the connecting part of a fuel cartridge in the fuel cell of FIG. 1.

FIG. 4 is a perspective view showing each connecting part of plurality of fuel cartridges having different shapes. The connecting part 1225 shown in FIG. 4(A) has a circular shape, the connecting part 1225 shown in FIG. 4(B) has a rectangular shape and the connecting part 1225 shown in FIG. 4(C) has generally a L-shape. Namely, these connecting groups have shapes which are not overlapped with each other. In this embodiment, these fuel cartridges 1220 are intended to receive different types of fuels.

Figure 6:
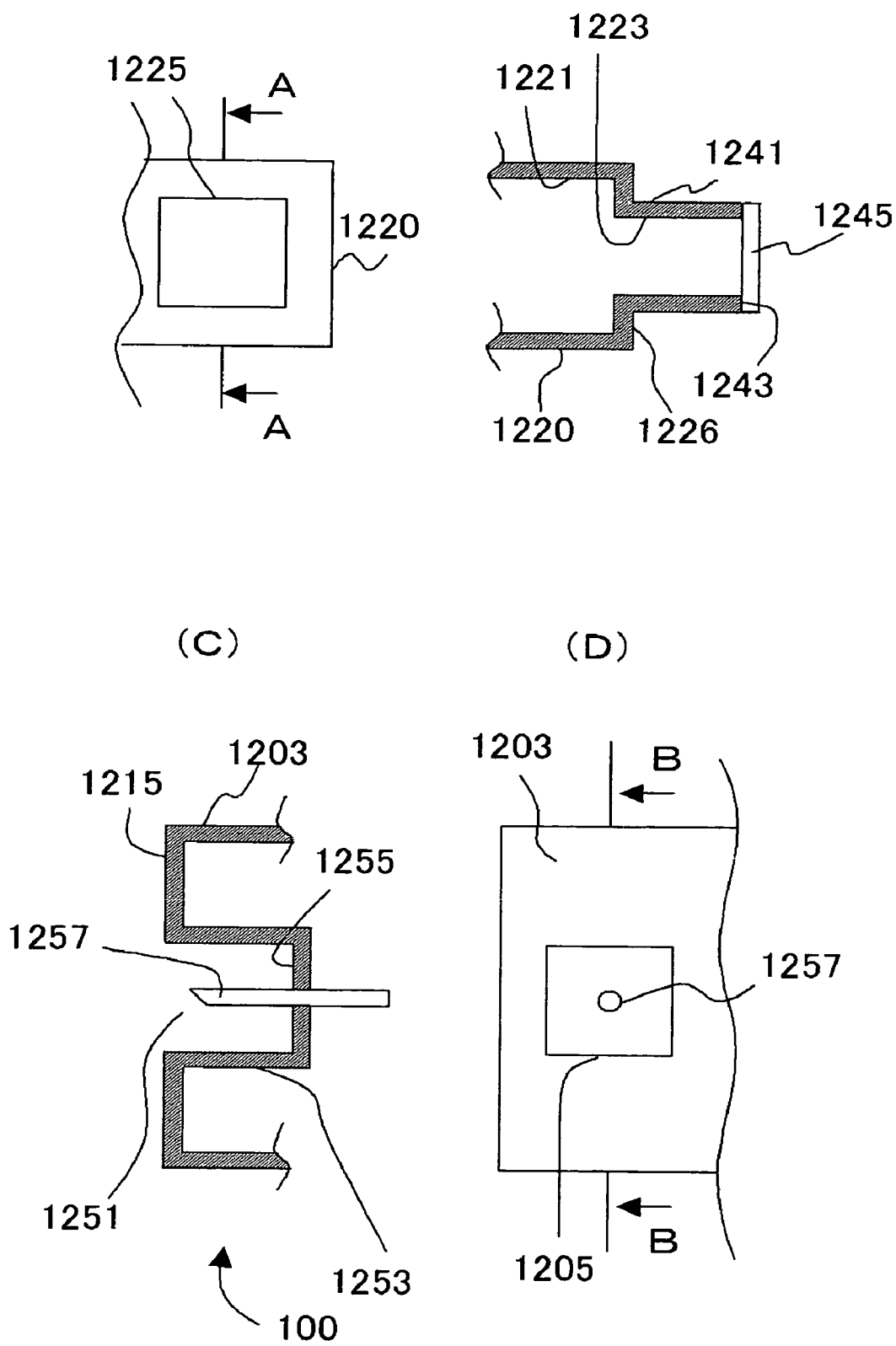
FIG. 6 is a view showing the connecting part of a fuel cartridge and a fitting part of a fuel cell having a shape fitted into the fuel cartridge connecting part.

FIGS. 5, 6 and 7 are views showing the connecting part 1225 of the fuel cartridge 1220 shown in each of FIGS. 4(A), 4(B) and 4(C) and each fitting part 1205 on the fuel cell 100 side at which fitting part 1205 is fitted into the connecting part 1225 of the fuel cartridge 1220. FIGS. 5(A) 6(A) and 7(A) are respectively a front view of the connecting part 1225 of the fuel cartridge 1220. FIGS. 5(B), 6(B) and 7(B) are respectively a cross-sectional view taken along the line A-A of each of FIGS. 5(A) to 7(A). FIGS. 5(D), 6(D) and 7(D) are respectively a front view of the fitting part 1205. FIGS. 5(C), 6(C) and 7(C) are respectively a cross-sectional view taken along the line B-B of each of FIGS. 5(D) to 7(D).

As shown in FIG. 5(A) and FIG. 5(B), the connecting part 1225 of the fuel cartridge 1220 is provided with a circular injection port 1223 formed on the fitting plane 1226 of the fuel cartridge 1220 and a cylindrical insertion part 1241 projecting in a direction substantially vertical to the fitting plane 1226 from the injection port 1223. A diaphragm 1245 that seals the fuel 124 is disposed at an end part 1243 of the insertion part 1241. The diaphragm 1245 is preferably made of a material which is elastic and stretchable and does not transmit the fuel 124.

As shown in FIG. 5(c) and FIG. 5(D), the fitting part 1205 of the fuel cell 100 is formed so as to have a size and shape permitting the connecting part 1225 of the fuel cartridge 1220 to be fitted therewith. Specifically, the fitting part 1205 includes a circular opening part 1251 having a slightly larger diameter than and almost the same shape as the injection port 1223 of the connecting part 1225 of the fuel cartridge 1220, a cylindrical introduction part 1253 extending in a direction substantially vertical to the receiving plane 1215 of the casing 1203 from the opening part 1251, a circular bottom part 1255 formed at the end of the introduction part 1253 and a hollow needle 1257 extending towards the inside and outside of the casing 1203 from the center of the bottom part 1255 in substantially parallel to the center axis of the introduction part 1253. The opening part 1251 is formed on the receiving plane 1215 of the casing 1203.

When the connecting part 1225 of the fuel cartridge 1220 is inserted into the fitting part 1205 of the fuel cell 100, a diaphragm 1245 of the fuel cartridge 1220 is pierced by the hollow needle 1257 of the fitting part 1205 of the fuel cell 100 with the result that the fuel chamber 1221 of the fuel cartridge 1220 and the fuel supplying passage 1207 (see FIG. 1) of the fuel cell 100 are communicated with each other through the hollow needle 1257. Here, the diaphragm 1245 is preferably constituted of a material that is stretchable enough to shield the pierced part between the diaphragm and the hollow needle 1257 when fuel is injected into the fuel supplying passage 1207. The diaphragm 1245 may be made from high-density rubber or a septum.

When the lid 1235 shown in FIG. 2 is closed in this condition, the fuel cartridge 1220 is pressed against the casing 1203 by the press part 1239 disposed inside of the lid 1235, so that the fitting plane 1226 of the fuel cartridge 1220 is brought into contact with the receiving plane 1215 of the casing 1203 of the fuel cell 100 whereby the fuel cartridge 1220 is mounted (see FIG. 3).

Also, in the construction shown in FIG. 6(A) and FIG. 6(B), the connecting part 1225 of the fuel cartridge 1220 includes a square injection port 1223 and the insertion part 1241.

In the construction shown in FIG. 6(C) and FIG. 6(D), the fitting part 1205 of the fuel cell 100 has a size and a shape which allows the connecting part 1225 of the fuel cartridge 1220 shown in FIG. 6(A) and FIG. 6(B) to be fitted into the fuel cell 100.

In FIG. 6, also, when the connecting part 1225 of the fuel cartridge 1220 is inserted into the fitting part 1205 of the fuel cell 100, the diaphragm 1245 of the fuel cartridge 1220 is pierced by the hollow needle 1257 of the fitting part 1205 of the fuel cell 100 with the result that the fuel chamber 1221 of the fuel cartridge 1220 and the fuel supplying passage 1207 (see FIG. 1) are communicated with each other through the hollow needle 1257 in the same manner as in the case explained with reference to FIG. 5.

Also, in the construction shown in FIG. 7(A) and FIG. 7(B), the connecting part 1225 of the fuel cartridge 1220 includes a L-shaped injection port 1223 and the insertion part 1241.

In the construction shown in FIG. 7(C) and FIG. 7(D), the fitting part 1205 of the fuel cell 100 has a size and a shape which allows the connecting part 1225 of the fuel cartridge 1220 shown in FIG. 7(A) and FIG. 7(B) to be fitted into the fuel cell 100.

In FIG. 7, also, when the connecting part 1225 of the fuel cartridge 1220 is inserted into the fitting part 1205 of the fuel cell 100, the diaphragm 1245 of the fuel cartridge 1220 is pierced by the hollow needle 1257 of the fitting part 1205 of the fuel cell 100 with the result that the fuel chamber 1221 of the fuel cartridge 1220 and the fuel supplying passage 1207 are communicated with each other through the hollow needle 1257 in the same manner as in the case explained with reference to FIG. 5.

In this embodiment, the connecting parts 1225 of the fuel cartridge 1220 receiving different type of fuels is constituted so as to have different shapes. The fuel cartridge 1220 is provided with the connecting part 1225 which can be discriminated by the type and concentration of the fuel to be filled and/or the presence or absence of additives. Also, the fitting part 1205 of the fuel cell 100 is formed so as to be fitted into the connecting part 1225 of the fuel cartridge 1220 thus constituted above.

Explanations will be furnished as to the action of the fuel cell of this embodiment in the above manner with reference to drawings 1 to 7.

Here, the fuel cartridge 1220 provided with the connecting part 1225 having the shape shown in FIG. 4(A) receives an aqueous 10% methanol solution, the fuel cartridge 1220 provided with the connecting part 1225 having the shape shown in FIG. 4(B) receives an aqueous 30% methanol solution and the fuel cartridge 1220 provided with the connecting part 1225 having the shape shown in FIG. 4(C) receives an aqueous 50% methanol solution. On this assumption, the fuel cell will be explained hereinbelow.

When the fuel cell 100 uses the aqueous 10% methanol solution as the fuel 124, the fuel cell 100 is provided with the fitting part 1205 shown in FIG. 5(C) and FIG. 5(D). This fitting part 1205 can be fitted into only the connecting part 1225 shown in 5(A), but the fuel cartridge 1220 provided with the connecting part 1225 shown in FIG. 6(A) and FIG. 7(A) can be fitted into this fuel cell 100. Since only the fuel cartridge 1220 having the connecting part 1225 shown in FIG. 5(A) can be fitted into the fuel cartridge 100 in this manner, it is possible to prevent erroneous fitting of the fuel cartridge 1220 filled with a fuel except for the aqueous 10% methanol solution.

Similarly, when the fuel cell 100 uses the aqueous 30% methanol solution as the fuel 124, the fuel cell 100 may be provided only with the fitting part 1205 shown in FIG. 6(c) and FIG. 6(D). Also, when the fuel cell 100 uses the aqueous 50% methanol solution as the fuel 124, the fuel cell 100 may be provided with the fitting part 1205 shown in FIG. 7(c) and FIG. 7(D).

The fuel cartridge 1220 is provided with the connecting part 1225 which is discriminated based on the type and concentration of the fuel and the presence or absence of additives and the fuel cell 100 is provided with the fitting part 1205 corresponding to the connecting part 1225 to thereby enable an adequate fuel cartridge 1220 to be fitted into the fuel cell 100 selectively. This can prevent such an event that the fuel cartridge 100 containing an unusable fuel 124 is erroneously fitted into the fuel cell 100.

The explanations in the above embodiment are described as to an embodiment in which the connecting part 1225 of the fuel cartridge 1220 has a convex shape and the fitting part 1205 of the fuel cell 100 has a concave shape. The present invention is not limited to this embodiment, and the concave-convex relation may be reversed or the both may respectively have a concave-convex shape.

Also, FIG. 4 shows an example in which the connecting part 1225 has a circular shape, a rectangular shape or a generally L-shape. However, the shape of the connecting part 1225 is not limited to this and the connecting part 1225 may take various shapes.

Figure 8:
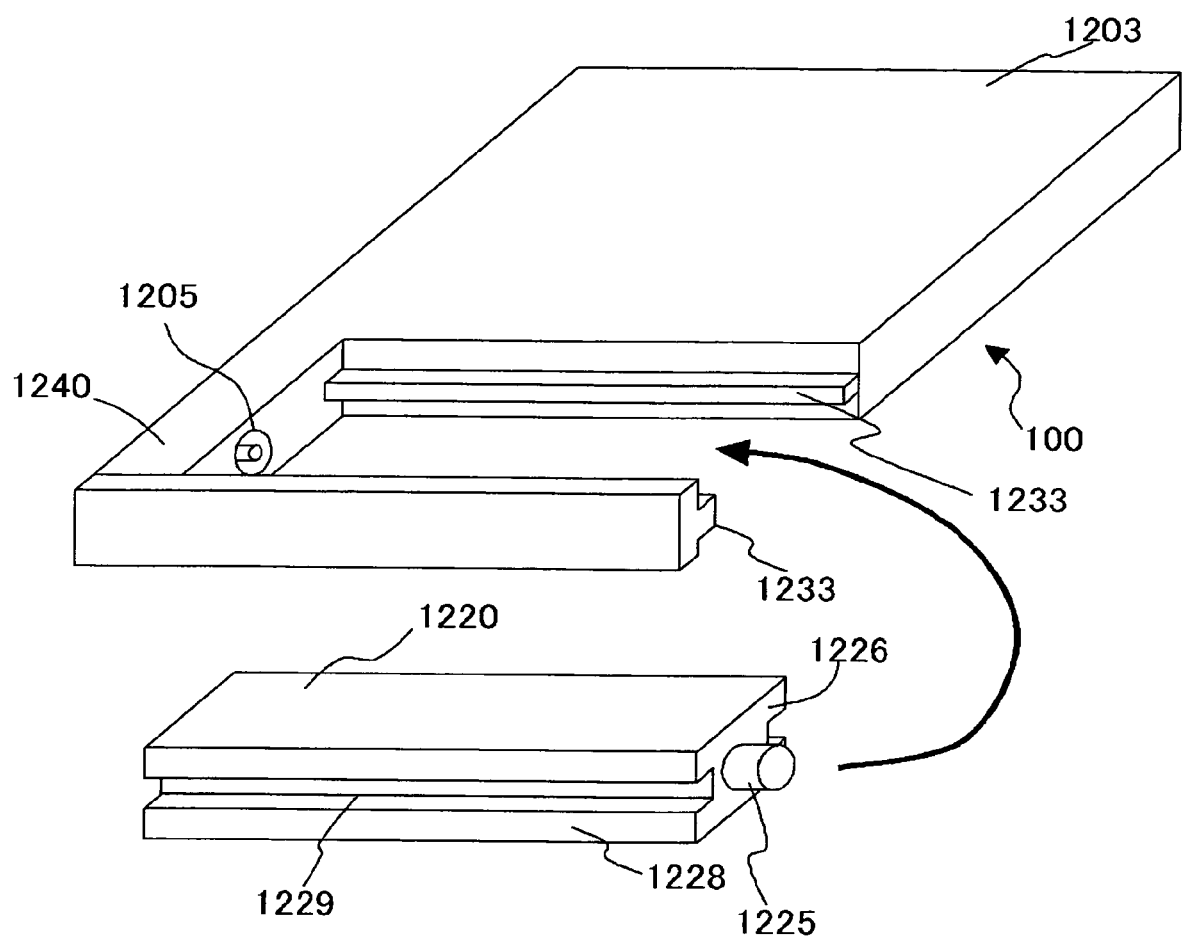
FIG. 8 is a perspective view showing another example of a cartridge fitting mechanism of the fuel cell shown in FIG. 1.

Also, the fuel cell 100 and the fuel cartridge 1220 may have a construction as shown in FIG. 8. Here, the fuel cartridge 1220 includes a connecting part 1225 formed on a fitting plane 1226 and a groove 1229 formed on each of two side surfaces 1228 thereof along a longitudinal direction substantially vertical to the fitting plane 1226.

The fuel cell 100 is provided with a housing unit 1240 having an opening that receives the fuel cartridge 1220 in a mountable manner. The housing unit 1240 is provided with a fitting part 1205. Also, a rail part 1233 having a shape which is fitted into the groove 1229 when the fuel cartridge is mounted is formed in the opening part of the housing unit 1240. Though not shown here, the fuel cell 100 may include, for example, a lid, a press part and a fixing part similar to the form shown in FIG. 2. Also, the fitting part 1205 of the fuel cell 100 and the connecting part 1225 of the fuel cartridge 1220 may have various shapes as shown in FIGS. 4 to 7. The same effect as above can be obtained also in the fuel cell 100 constructed in this manner.

Figure 9:
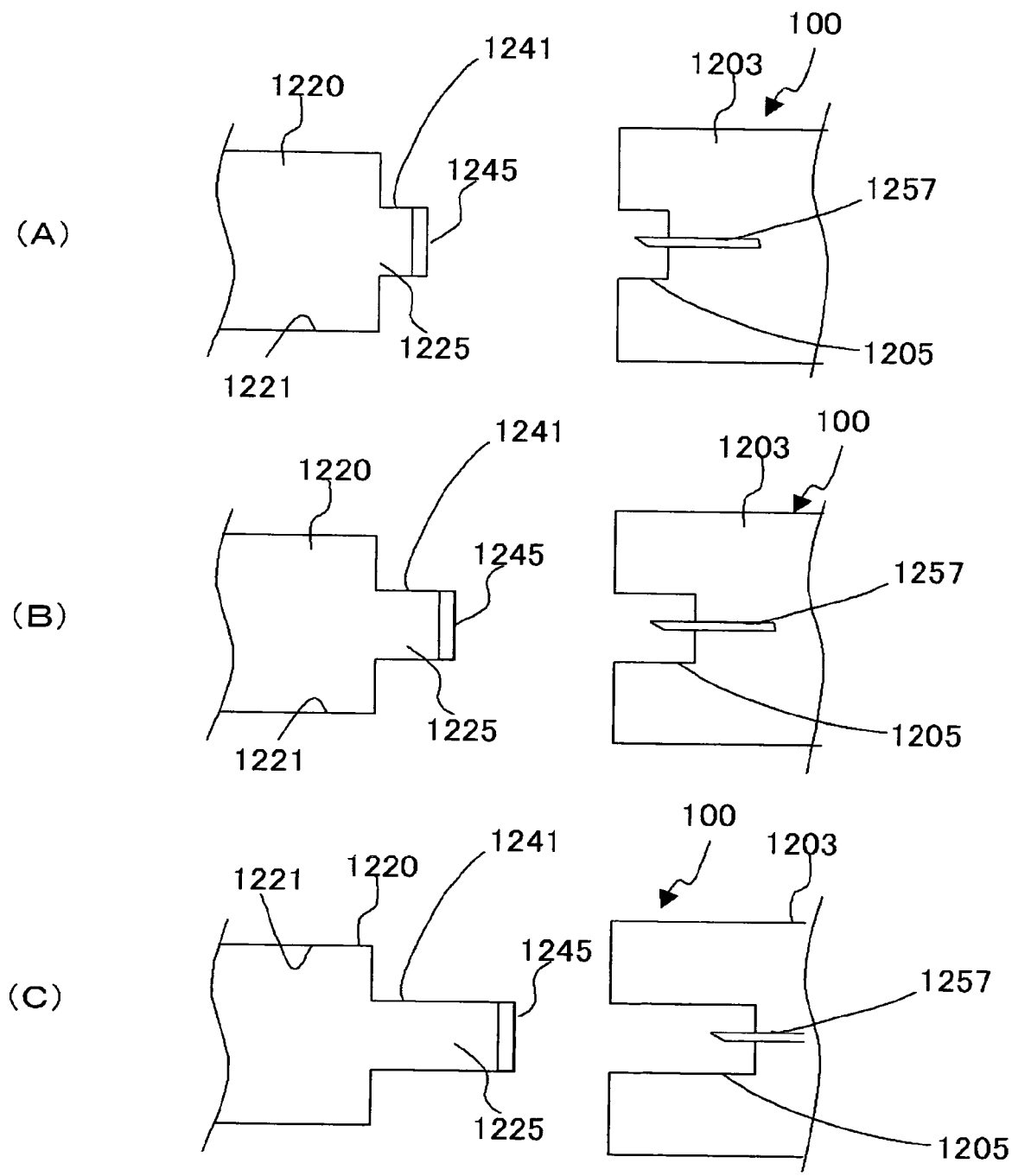
FIG. 9 is a view typically showing another example of the connecting part of a fuel cartridge corresponding to the fitting part of a fuel cell in an embodiment of the present invention.

FIG. 9 is a view showing other examples of the fuel cell 100 and fuel cartridge 1220.

Here, the fuel cartridge 1220 is constructed to have a shape fitted into the fuel cell 100 by allowing an insertion part 1241 of the connecting part 1225 to have a different height. The fitting part 1205 of the fuel cell 100 has depths enabling each of the insertion parts 1241 of the connecting parts 1225 of the fuel cartridge 1220 to be fitted.

Also, a hollow needle 1257 disposed in the fitting part 1205 of each fuel cell 100 is so designed to have a projection having only a length necessary and sufficient to pierce a diaphragm 1245 of the connecting part 1225 of the fuel cartridge 1220. Such a structure ensures that when, for example, the fuel cartridge 1220 of FIG. 9(A) is mounted on the fuel cell 100 of FIG. 9(B), the hollow needle 1257 does not reach the diaphragm 1245 of the fuel cartridge 1220 though the connecting part 1225 of the fuel cartridge 1220 can be inserted, and therefore, the fuel chamber 1221 of the fuel cartridge 1220 is not communicated with the fuel supplying passage 1207 of the fuel cell 100 through the hollow needle 1257.

Also, the fuel cell 100 is constructed so as to detect whether the fuel cartridge 1220 is adequately mounted or not. The fuel cell 100 may be constructed such that it can work only when the fuel cartridge 1220 is adequately mounted. Whether or not the fuel cartridge 1220 is adequately mounted can be judged by the state whether the lid 123 (see FIG. 2) is closed or not. This ensures that when, for example, the fuel cartridge 1220 of FIG. 9(C) is mounted on the fuel cell 100 of FIG. 9(A), the lid 1235 can not be closed and therefore, the fuel cell 100 does not work, thereby making it possible to prevent an inadequate fuel cartridge 1220 from being mounted.

Figure 10:
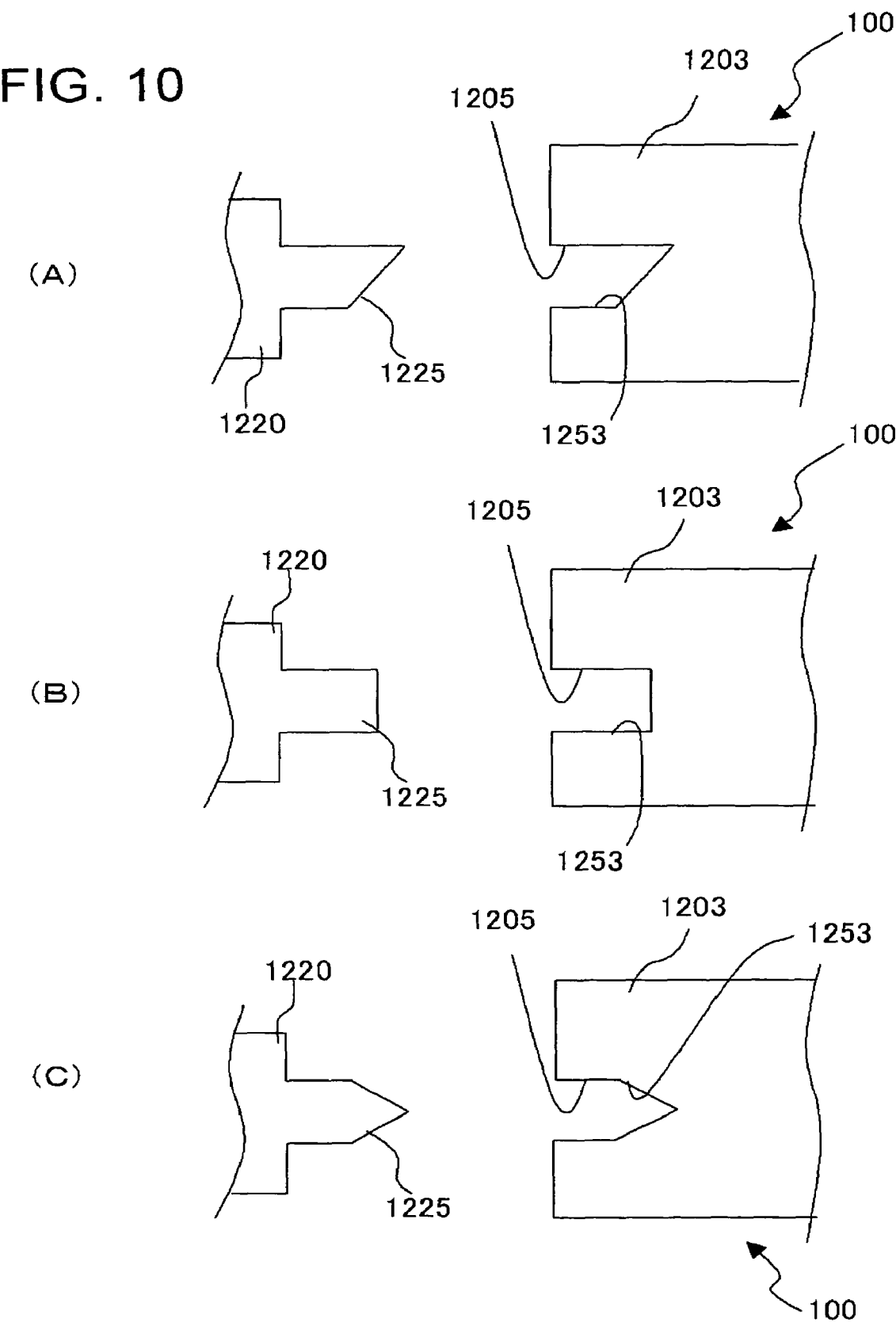
FIG. 10 is a view typically showing another example of the connecting part of a fuel cartridge corresponding to the fitting part of a fuel cell in an embodiment of the present invention.

FIG. 10 is another example of the fuel cell 100 and fuel cartridge 1220.

The fuel cartridge 1220 can have a shape fitted into the fuel cell 100 by making the connecting part 1225 have a different shape of a vertical cross-section. The fitting part 1205 of the fuel cell 100 includes an introduction part 1253 having a shape fitted into the connecting part 1225 of the fuel cartridge 1220.

In this embodiment, as mentioned above, the fuel cartridge 1220 is provided with the connecting part 1225 corresponding to the fuel to be filled and the fuel cell 100 is provided with the fitting part 1205 corresponding to the connecting part 1225, which makes it possible to fit the fuel cartridge 1220 filled with an adequate fuel in the fuel cell 100.

SECOND EMBODIMENT

In this embodiment, the fuel cell 100 has a structure in which a proper fitting part can be selected so that a fuel cartridge filled with an adequate fuel can be selected depending on the working environment and situation.

Figure 11:
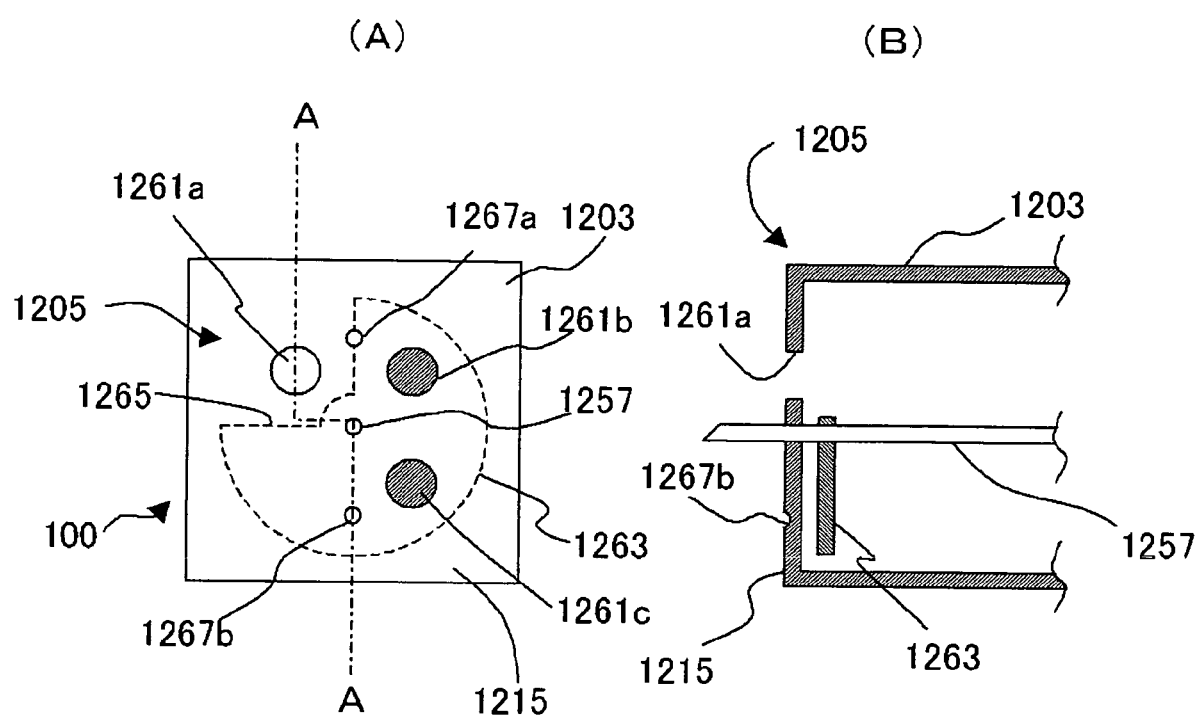
FIG. 11 is a view typically showing one example of the fitting part of a fuel cell in an embodiment of the present invention.

FIG. 11 is a view typically showing one example of the fitting part of the fuel cell in this embodiment, wherein FIG. 11(A) is a front view and FIG. 11(B) is a cross-sectional view taken along the line A-A in FIG. 11(A).

In this embodiment, plurality of receiving holes 1261$a$, 1261$b$ and 1261$c$ (three in FIG. 11), a shutter 1263 that opens only one of these receiving holes 1261$a$ to 1261$c$ and shuts the remaining holes, a hollow needle 1257, an alignment convex part 1267$a$ and an alignment concave 1267$b$ are provided on a receiving plane 1215 of a casing 1203 of the fuel cell 100. The shutter 1263 is provided on the backside or front side of the receiving plane 1215. Here, a structure in which the shutter 1263 is provided on the backside of the receiving plane 1215 is shown. The hollow needle 1257 is provided in the state substantially vertical to the receiving plane 1215.

In this embodiment, the function of the fitting part 1205 is attained by the plurality of receiving holes 1261$a$ to 1261$c$, the shutter 1263, the alignment convex part 1267$a$ and the alignment concave part 1267$b$. These plurality of receiving holes 1261$a$, 1261$b$ and 1261$c$ are arranged at predetermined angle intervals on the circumference around the same axis as that of the hollow needle 1257. The number of the receiving holes can be made to correspond to, for example, the number of types of fuel which can be switched to use.

The shutter 1263 is a circular plate provided with an opening part 1265 that opens one of the receiving holes 1261$a$ to 1261$c$. The shutter 1263 is allowed to rotate around the same axis as that of the hollow needle 1257 by a shutter driving mechanism (not shown in the drawings) and can take three different positions at which it opens each of the receiving holes 1261$a$ to 1261$c$. The position of the shutter 1263 may be changed by hand or by a motor (not shown in the drawings) under automatic control. This makes it possible to open only one of the plurality of receiving holes 1261$a$ to 1261$c$ of the fitting part 1205 of the fuel cell 100 at each of the above three positions.

Figure 12:
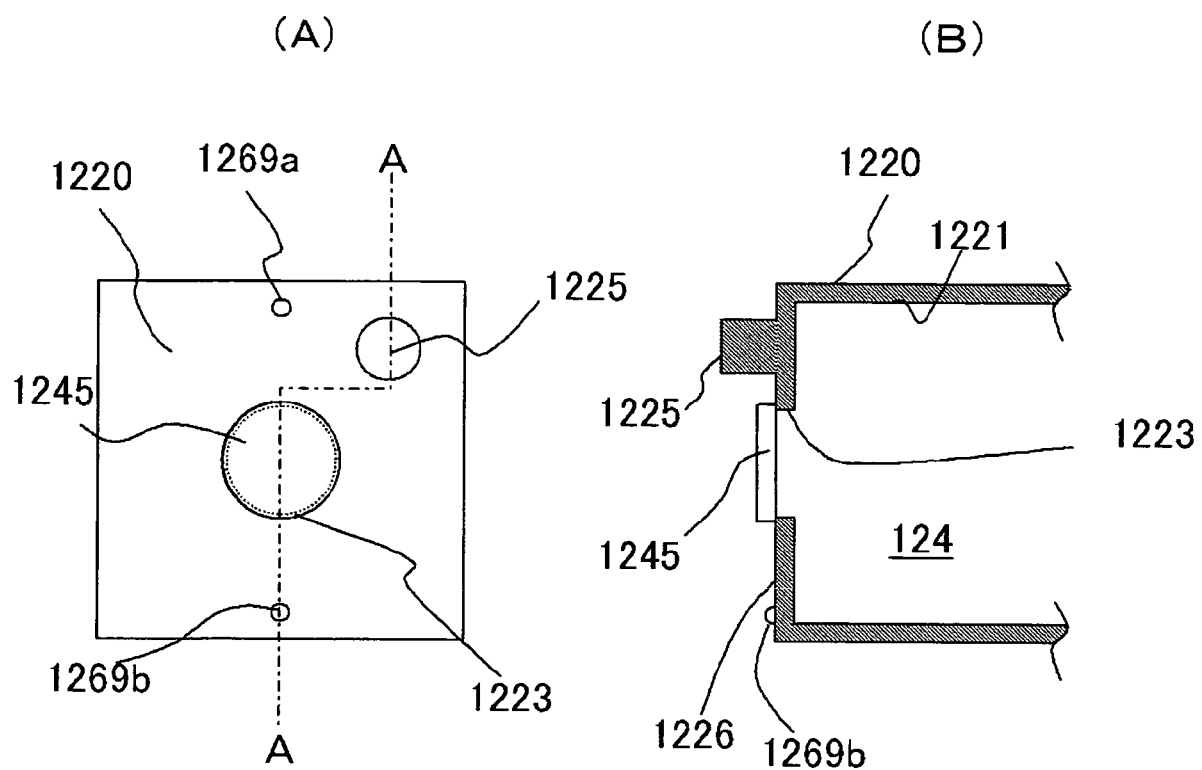
FIG. 12 is a view showing the connecting part of a fuel cartridge mountable on the fuel cell of FIG. 11.
Figure 13:
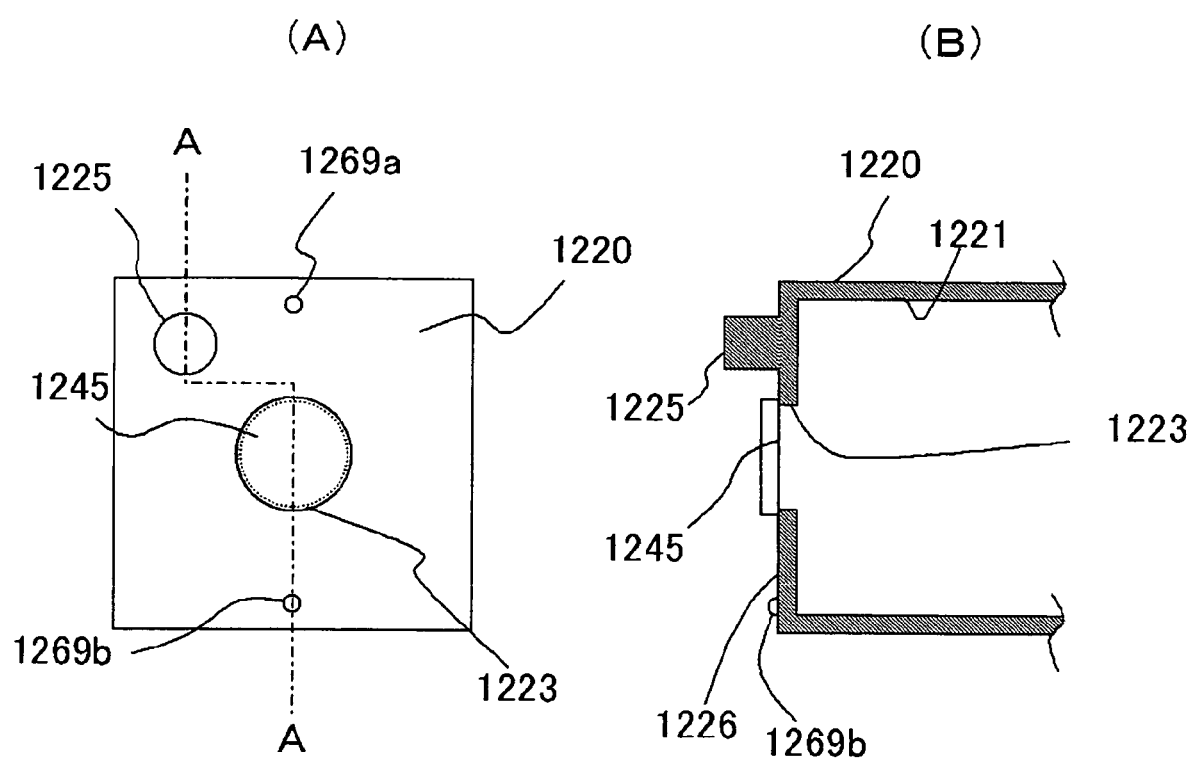
FIG. 13 is a view showing the connecting part of a fuel cartridge mountable on the fuel cell of FIG. 11.
Figure 14:
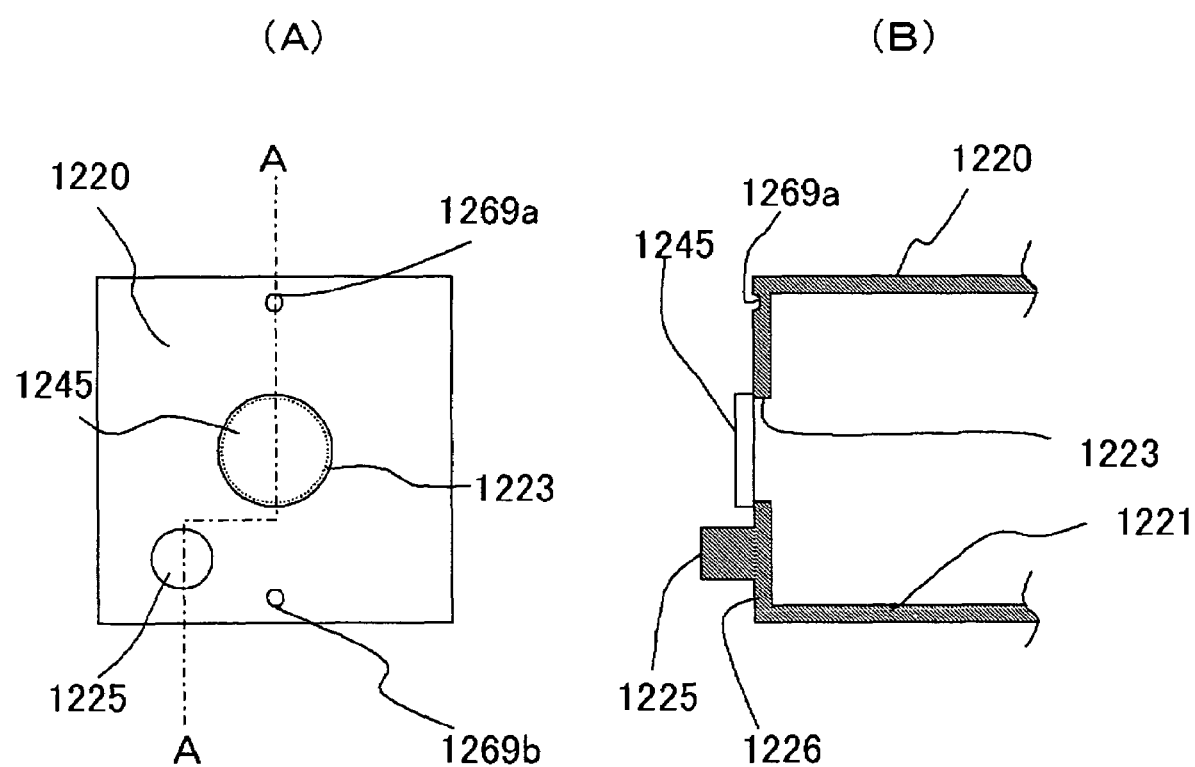
FIG. 14 is a view showing the connecting part of a fuel cartridge mountable on the fuel cell of FIG. 11.

FIGS. 12, 13 and 14 are views respectively showing the connecting part of a fuel cartridge mountable on the fuel cell of FIG. 11. FIGS. 12(A), 13(A) and 14(A) are front views and FIGS. 12(B), 13(B) and 14(B) are cross-sectional views taken along the line A-A in FIGS. 12(A), 13(A) and 14(A).

In this embodiment, the fuel cartridge 1220 shown in FIG. 12 is fitted into the fuel cell 100 when the opening part 1265 of the shutter 1263 shown in FIG. 11 opens the receiving hole 1261$a$. The fuel cartridge 1220 includes an injection port 1223 disposed on a fitting plane 1226 of the fuel cartridge 1220, a cylindrical connecting part 1225 projecting in a direction substantially vertical to the fitting plane 1226 and a diaphragm 1245 that covers the injection port 1223 to seal a fuel 124. The fuel cartridge 1220 further includes an alignment concave part 1269$a$ and an alignment convex part 1269$b$ which is fitted to the alignment convex part 1267$a$ and alignment concave part 1267$b$ of the fitting part 1205 of the fuel cell 100 respectively.

The fuel cartridge 1220 shown in FIG. 13 is fitted into the fuel cell 100 when the opening part 1265 of the shutter 1263 shown in FIG. 11 opens the receiving hole 1261$b$. Similarly, the fuel cartridge 1220 shown in FIG. 14 is fitted into the fuel cell 100 when the opening part 1265 of the shutter 1263 shown in FIG. 11 opens the receiving hole 1261$c$.

Figure 15:
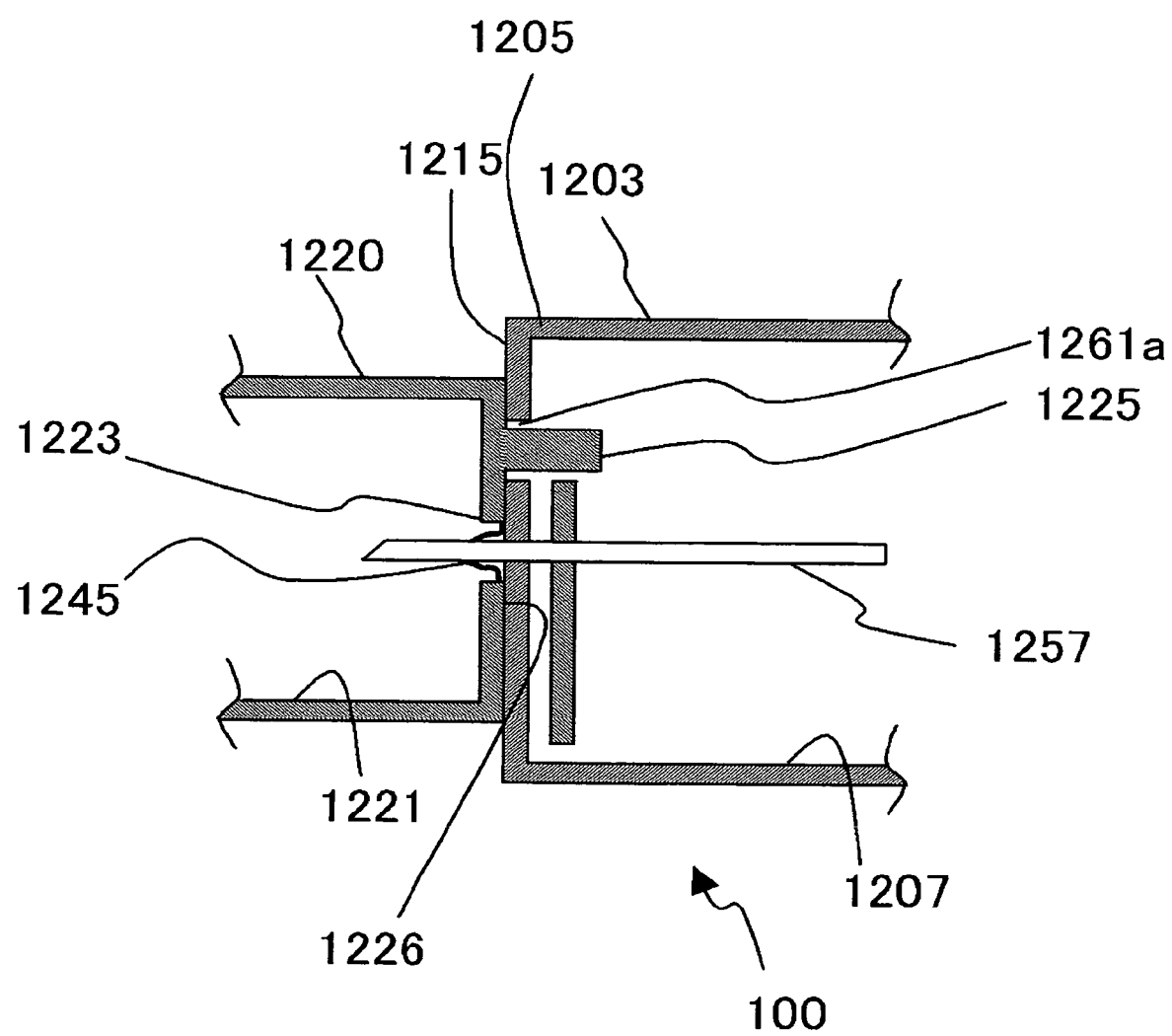
FIG. 15 is a cross-sectional view showing the condition of the fuel cell of FIG. 11 which is mounted on the fuel cartridge of FIG. 12.

FIG. 15 is a cross-sectional view showing the situation where the fuel cartridge shown in FIG. 12 is mounted on the fuel cell of FIG. 11. When the connecting part 1225 of the fuel cartridge 1220 is inserted into the receiving hole 1261$a$ of the fitting part 1205 of the fuel cell 100, the diaphragm 1245 disposed on the injection port 1223 of the fuel cartridge 1220 is pierced by the hollow needle 1257 of the fuel cell 100 with the result that the fuel chamber 1221 of the fuel cartridge 1220 is communicated with the fuel supplying passage 1207 through the hollow needle. At this time, the filling plane 1226 of the fuel cartridge 1220 is brought into contact with the receiving plane 1215 of the fuel cell 100.

In this embodiment, the shutter 1263 of the fuel cell 100 is turned to open a desired receiving hole, thereby making it possible to decide the fuel cartridge 1220 that can be fitted into the fuel cell 100. This enables the selection of a fuel cartridge which can be fitted into the fuel cell 100 depending on the environment and situation where the fuel cell 100 is used.

In the above examples, the case where three receiving holes are provided are described. However, there is no limitation to the number of the receiving holes.

FIG. 16 is a view showing other examples of the fuel cell 100 and fuel cartridge 1220.

As shown in FIG. 16(A), the fuel cell 100 may have a structure provided with one receiving hole 1281. The receiving hole 1281 is a fan-shaped opening formed on the same axis as that of the hollow needle 1257. The shutter 1263 is a circular plate having an opening part 1265 that opens a part of the receiving hole 1281. Here, the opening part 1265 of the shutter 1263 opens only an area of one part of the receiving hole 1281 divided into three parts. The shutter 1263 is rotatable around the same axis as that of the hollow needle 1257 by a shutter diving mechanism (not shown in the drawings) and takes three different positions.

FIGS. 16(B) to 16(D) are views showing fuel cartridges 1220 respectively having a connecting part 1225 that is selectively fitted in the receiving hole 1281 when the shutter 1263 of the fuel cell 100 shown in FIG. 16(A) takes three different positions.

In the fuel cell 100 and the fuel cartridges 1220 constituted in this manner, any one of the fuel cartridges 1220 shown in FIGS. 16(B) to 16(D) is mountable on the fuel cell 100 depending on the position at which the opening part 1265 of the shutter 1263 opens the receiving hole 1281. It is therefore possible to selectively set the fuel cartridges 1220 to be fitted into the fuel cell 100.

Figure 17:
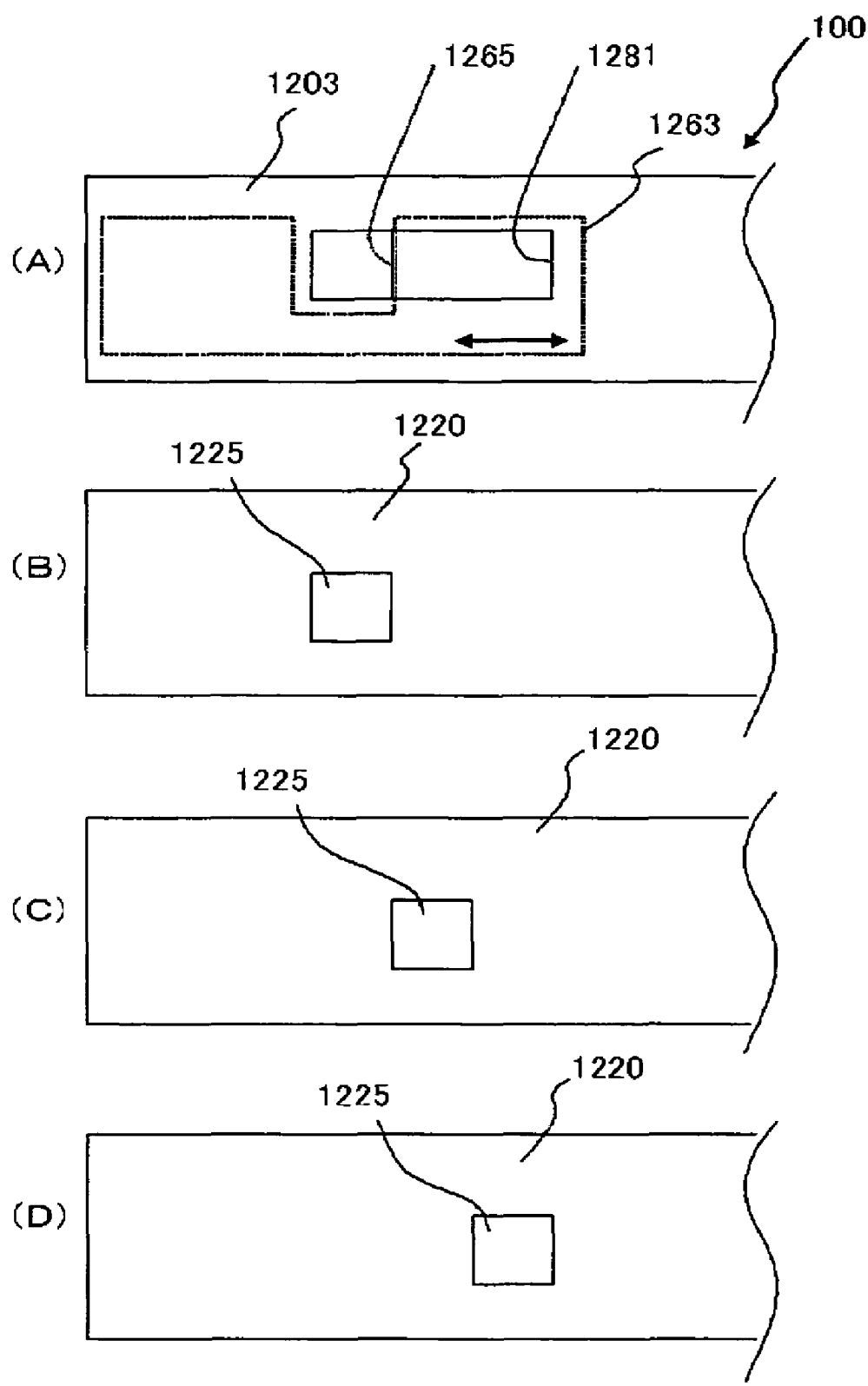
FIG. 17 is a view typically showing another example of the connecting part of a fuel cartridge corresponding to the fitting part of a fuel cell in an embodiment of the present invention.

FIG. 17 is a view showing further examples of the fuel cell 100 and fuel cartridge 1220.

As shown in FIG. 17(A), the fuel cell 100 may take a structure including a slide shutter 1263 provided with an opening part 1265, wherein the opening position of the receiving hole 1281 is changed by sliding the shutter 1263. The shutter 1263 is movable in a lateral direction in the drawing by a shutter driving mechanism (not shown in the drawings) and takes three different positions.

FIGS. 17(B) to 17(D) are views showing fuel cartridges 1220 respectively having a connecting part 1225 that is selectively fitted in the receiving 1281 when the shutter 1263 of the fuel cell 100 shown in FIG. 17(A) takes three different positions.

Also, in the same manner as in the first embodiment explained with reference to FIGS. 5 to 7, a structure may be adopted in which the fuel cell 100 is provided with plurality of fitting parts 1205 having different shapes and any one of these fitting parts is opened by the shutter 1263.

Moreover, in the same manner as in the first embodiment explained with reference to FIG. 9, a structure may be adopted in which the fitting parts 1205 are made to have different depths and anyone of these fitting parts is opened by the shutter 1263.

Figure 18:
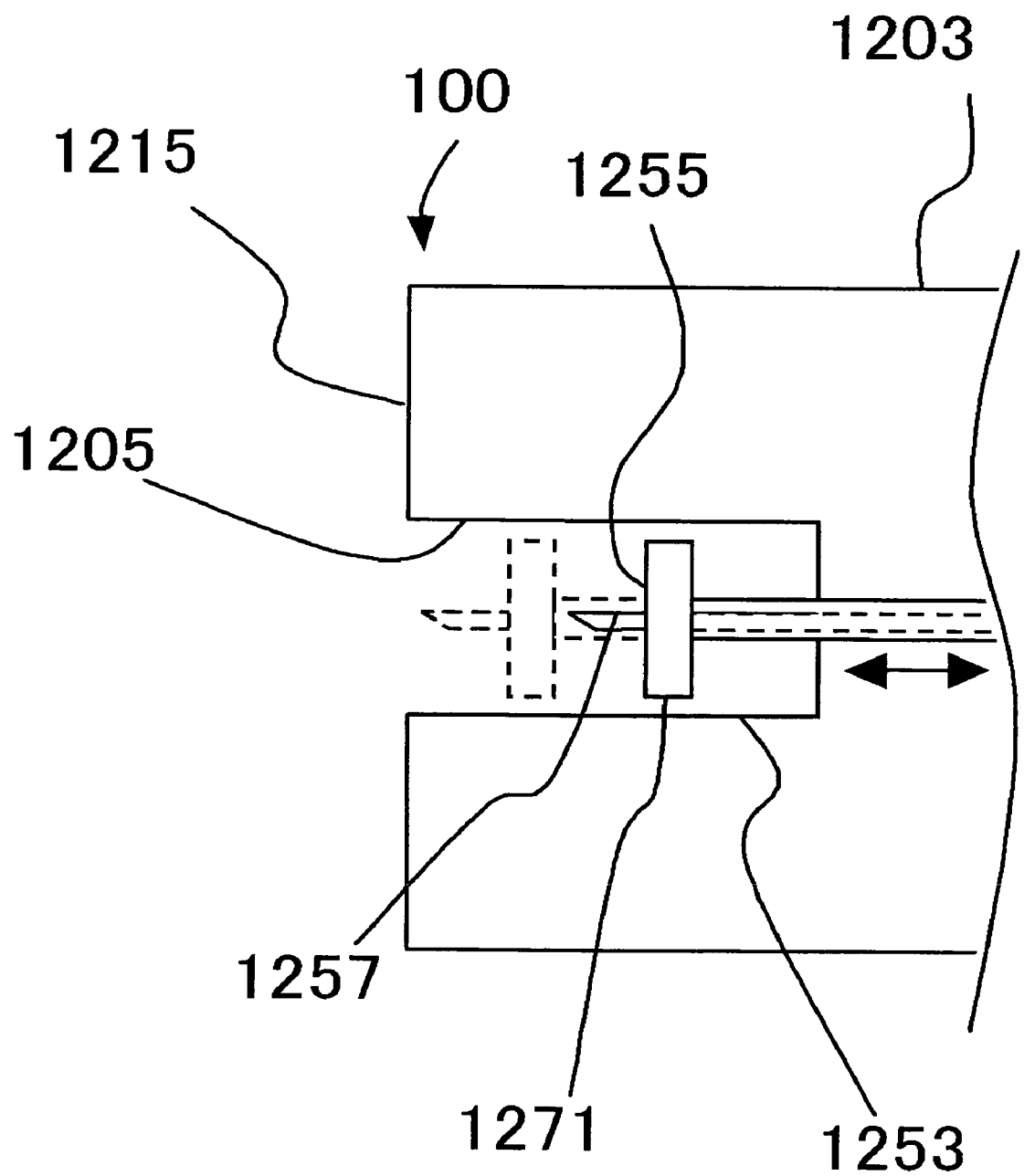
FIG. 18 is a view typically showing another example of the fitting part of the fuel cell of FIG. 9.
Figure 19:
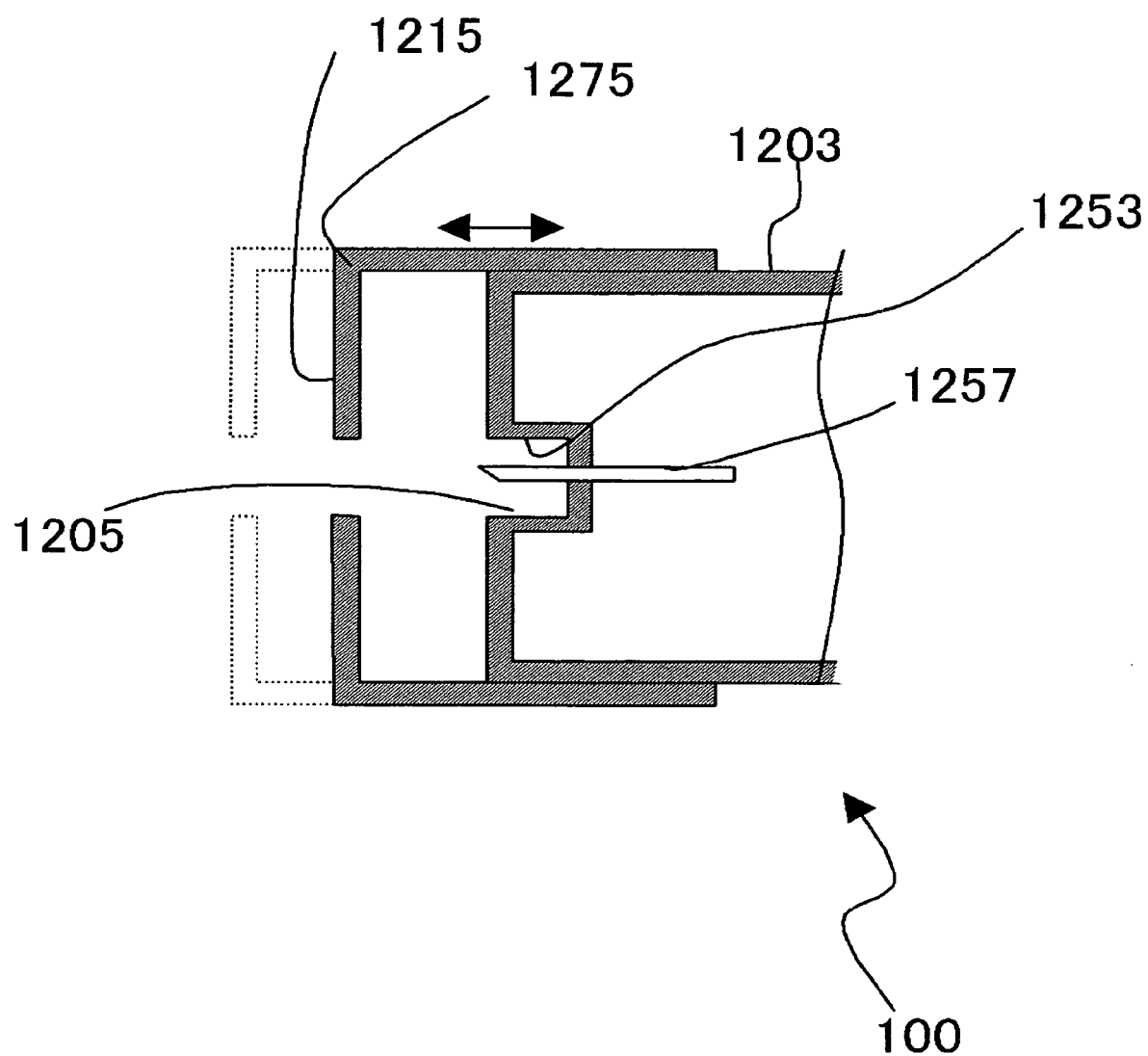
FIG. 19 is a view typically showing another example of the fitting part of the fuel cell of FIG. 9.

FIGS. 18 and 19 are views showing another example of the fuel cell 100. Here, the fuel cell 100 is provided with a mechanism that changes the depth of an introduction part 1253 of the fitting part 1205. At this time, the same fuel cartridge 1220 as that shown in FIG. 9 is fitted into the fuel cell 100.

In FIG. 18, the fuel cell 100 includes a bottom moving part 1271 that moves the bottom part 1255 of the introduction part 1253 of the fitting part 1205 in the direction of the depth of the introduction part 1253. Here, a hollow needle 1257 is disposed in the center of the bottom part 1255 and moves together with the bottom part 1255. In this fuel cell 100, the bottom moving part 1271 moves the bottom part 1255 to thereby change the depth of the introduction part 1253 of the fitting part 1205.

In FIG. 19, the fuel cell 100 includes a receiving plane moving unit 1275 that moves the receiving plane 1215 in the direction of the axis of the hollow needle 1257. In this fuel cell 100, the receiving plane moving unit 1275 moves the receiving plane 1215 to thereby change the depth of the introduction part 1253 of the fitting part 1205.

As mentioned above, in this embodiment, the fitting part 1205 corresponding to the connecting part 1225 of the fuel cartridge 1220 which is intended to be fitted on the fuel cell 100 side can be selectively set. It is therefore possible to select a fuel cartridge which can be fitted into the fuel cell 100 depending on the environment and situation where the fuel cell 100 is used.

THIRD EMBODIMENT

In this embodiment, the fuel cell 100 identifies the mounted fuel cartridge 1220 based on the condition of the electrical connection with the fuel cartridge 1220. Also, the fuel cell 100 detects the type of fuel contained in the mounted fuel cartridge 1220 and controls the operation condition depending on the type of fuel.

Figure 20:
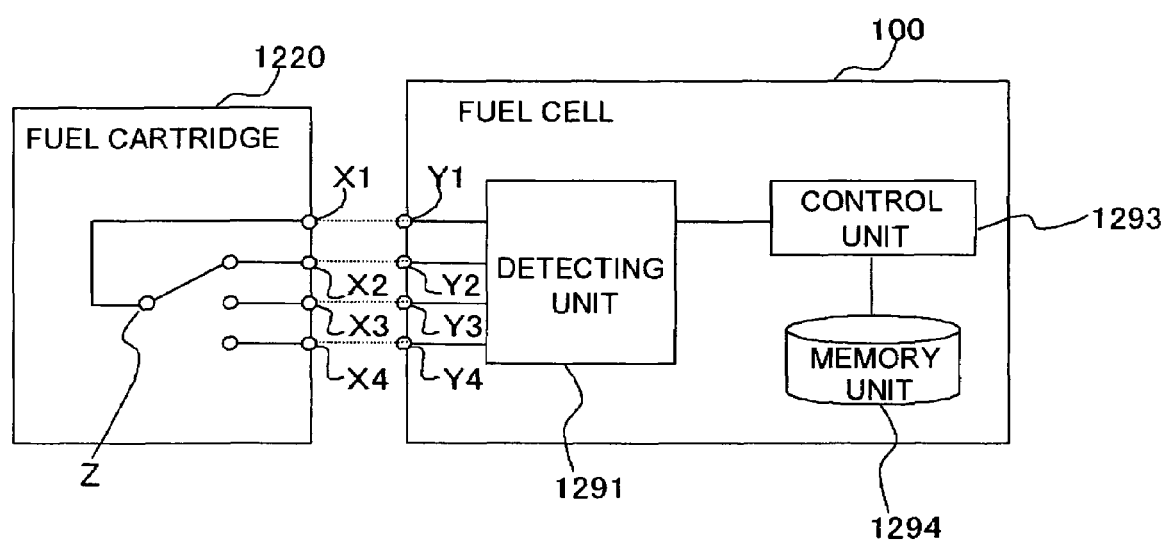
FIG. 20 is a block diagram typically showing one example of the construction of a fuel cell in an embodiment of the present invention.

FIG. 20 is a view showing the fuel cell 100 and the fuel cartridge 1220 in this embodiment.

The fuel cartridge 1220 includes plurality of connecting terminals X1, X2, X3 and X4 and a terminal Z that selectively connects the connecting terminal X1 with any one of the connecting terminals X2, X3 and X4. The fuel cartridge 1220 is constructed so as to be able to select which one among the connecting terminals X2 to X4 to connect with the connecting terminal X1 depending on the type of fuel to be filled. Also, though it is assumed that the connecting terminal X1 is secured here, a structure may be adopted in which the fuel cartridge 1220 provided with a terminal connecting selectively with two terminals among the connecting terminals X1 to X4.

The fuel cell 100 includes plurality of connecting terminals Y1, Y2, Y3 and Y4, a detecting unit 1291 that detects the electrical connecting conditions among these connecting terminals Y1 to Y4, a control unit 1293 and a memory unit 1294.

The memory unit 1294 is, for example, a nonvolatile memory device and stores information concerning the electrical connecting conditions among these connecting terminals Y1 to Y4 and the type of fuel received by the fuel cartridge 1220 including the relation between the both.

Figure 21:
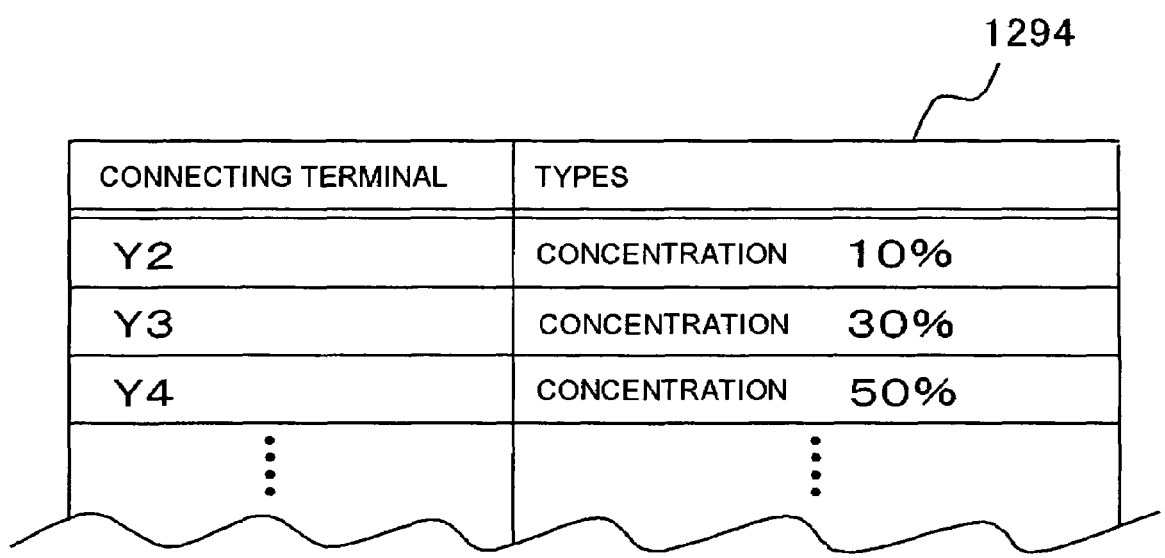
FIG. 21 is a view showing the internal structure of a memory unit of the fuel cell shown in FIG. 20.

Here, the connecting terminals X1 and X2 are electrically connected with each other through a terminal Z when the fuel cartridge 1220 shown in FIG. 20 contains fuel having a concentration of 10%, the connecting terminals X1 and X3 are electrically connected with each other through the terminal Z when the fuel cartridge 1220 contains a fuel having a concentration of 30% and the connecting terminals X1 and X4 are electrically connected with each other through the terminal Z when the fuel cartridge 1220 contains a fuel having a concentration of 50%. When the fuel cartridge 1220 which contains a fuel having a concentration of 10% is mounted on the fuel cell 100, the detecting unit 1291 detects the electrical connection of the connecting terminals Y1 and Y2 with the connecting terminals X1 and X2 of the fuel cartridge 1220. Similarly, when the fuel cartridge 1220 which contains a fuel having a concentration of 30% is mounted on the fuel cell 100, the detecting unit 1291 detects the electrical connection of the connecting terminals Y1 and Y3 with the connecting terminals X1 and X3 of the fuel cartridge 1220. Similarly, when the fuel cartridge 1220 which contains a fuel having a concentration of 50% is mounted on the fuel cell 100, the detecting unit 1291 detects the electrical connection of the connecting terminals Y1 and Y4 with the connecting terminals X1 and X4 of the fuel cartridge 1220. The memory unit 1294 stores memories concerning the type of connecting terminal detected by the detecting unit 1291 and the type of fuel contained in the fuel cartridge 1220 including the relation between the both as shown in FIG. 21.

The control unit 1293 discriminates the type of fuel contained in the mounted fuel cartridge 1220 with reference to the memory unit 1294 based on the electrical connecting condition detected by the detecting unit 1291. The control unit 1293 controls the operation of the fuel cell 100 depending on the type of fuel contained in the mounted fuel cartridge 1220. The control unit 1293 can control the driving of the pump 1211 shown in FIG. 1 depending on the concentration of the fuel contained in the mounted fuel cartridge 1220. The control unit 1293 can drive the pump 1211, so as to suppress the flow rate of the fuel when the fuel cartridge 1220 containing a high-concentration fuel is mounted on the fuel cell 100 or so as to increase the flow rate of the fuel when the fuel cartridge 1220 containing a low-concentration fuel is mounted on the fuel cell 100.

Moreover, the fuel cell 100 may include an opening part-opening and closing mechanism (shown in the drawings) such as a shutter that controls the opening and closing of the opening part 1251 (see FIG. 5). The detecting unit 1291 can also control the flow rate of the fuel 124 supplied from the fuel cartridge 1220 by adjusting the opening degree of the opening part 1251 by controlling the opening part-opening and closing mechanism.

The control unit 1293 may be a CPU (Central Processing Unit) or an IC (Integrated Circuit) and acts according to the procedures programmed in advance and stored in a memory device (not shown in the drawings). Also the control unit 1293 may be designed as a sequence circuit using a relay.

Figure 22:
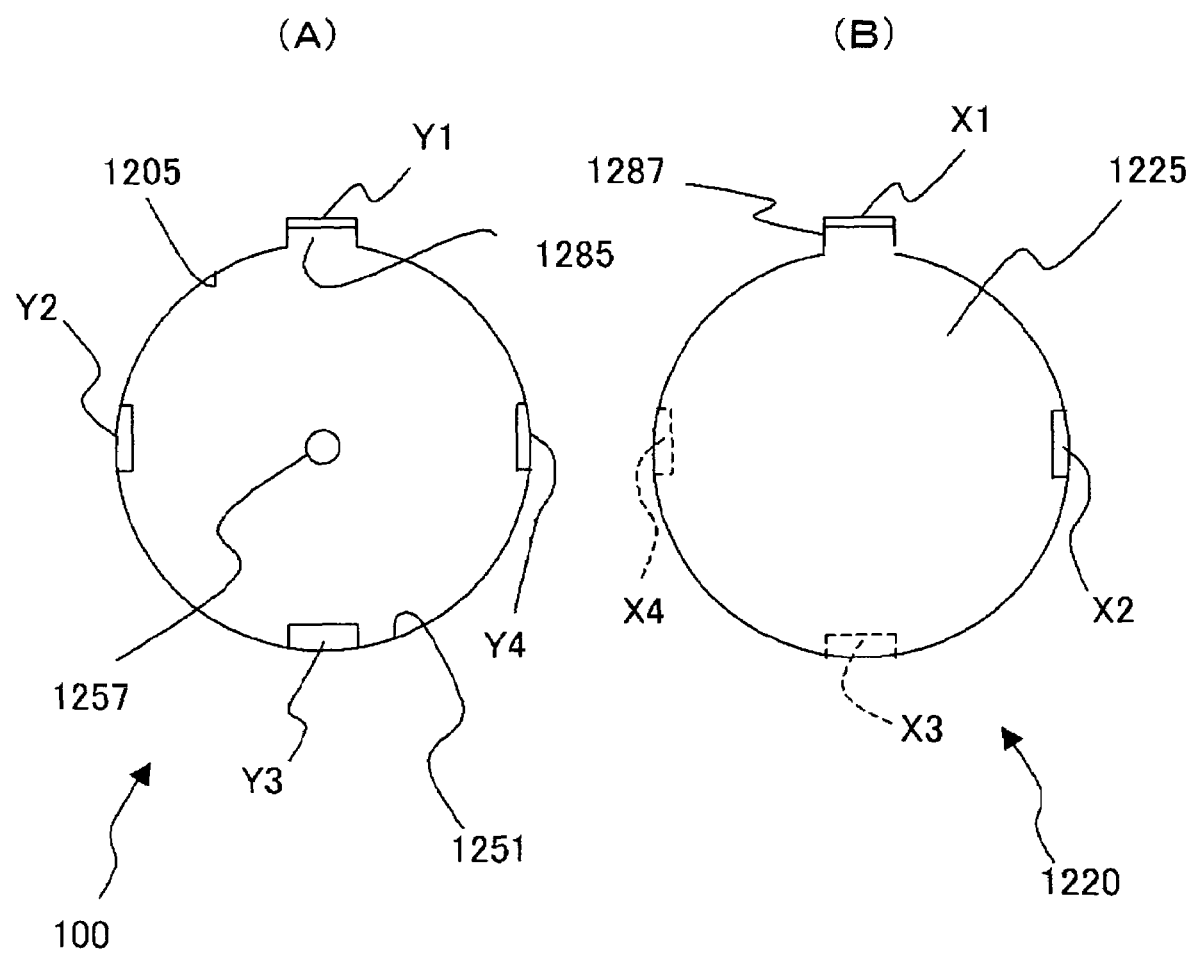
FIG. 22 is a view showing another example of a fuel cell in an embodiment of the present invention.

FIG. 22 is a view showing further examples of the fuel cell 100 and fuel cartridge 1220.

Here, the fitting part 1205 and the connecting part 1225 are formed such that they have shapes fitted into each other.

As shown in FIG. 22(A), the fitting part 1205 of the fuel cell 100 is provided with an alignment concave part 1285 disposed on the circumference of the fitting part 1205, a connecting terminal Y1 made of a metal plate which is disposed in the alignment concave part 1285 and three connecting terminals Y2, Y3 and Y4 each made of a metal plate which are disposed at fixed intervals on the circumference of the inside surface of the introduction part 1253 of the fitting part 1205.

The connecting part 1225 of the fuel cartridge 1220 is provided with an alignment convex part 1287 to be fitted into the alignment concave part 1285 and a connecting terminal X1 disposed in the alignment convex part 1287 as shown in FIG. 22(B). Also, the connecting part 1225 is provided with any of the connecting terminals X2, X3 and X4. Here, an example in which the connecting part 1225 is provided with a connecting terminal X2 is shown.

When the fuel cell 100 has such a construction, it is possible to detect which fuel cartridge 1220 is mounted based on the connecting conditions of the connecting terminals Y1 to Y4 and connecting terminals X1 to X4 when the connecting part 1225 of the fuel cartridge 1220 is fitted into the fitting part 1205 of the fuel cell 100.

Figure 23:
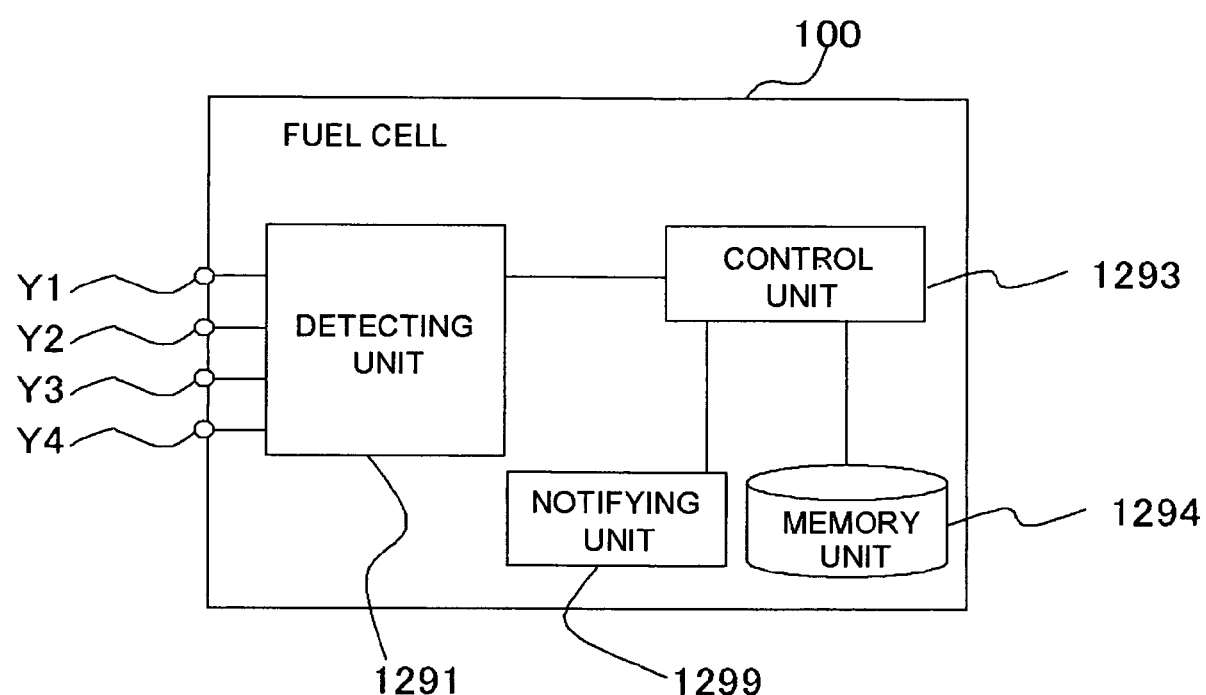
FIG. 23 is a block diagram showing another example of a fuel cell in an embodiment of the present invention.

Also, as shown in FIG. 23, the fuel cell 100 may be provided with a notifying unit 1299 notifying the type of the mounted fuel cartridge 1220 based on the information detected by the detecting unit 1291. The notifying unit 1299 may be, for example, displays such as a LED and a liquid display, sound output speakers or output terminals that output digital and/or analog output signals. Also, the notifying unit 1299 may be one informing whether or not the mounted fuel cartridge 1220 is fitted to the fuel cell 100.

FOURTH EMBODIMENT

Figure 24:
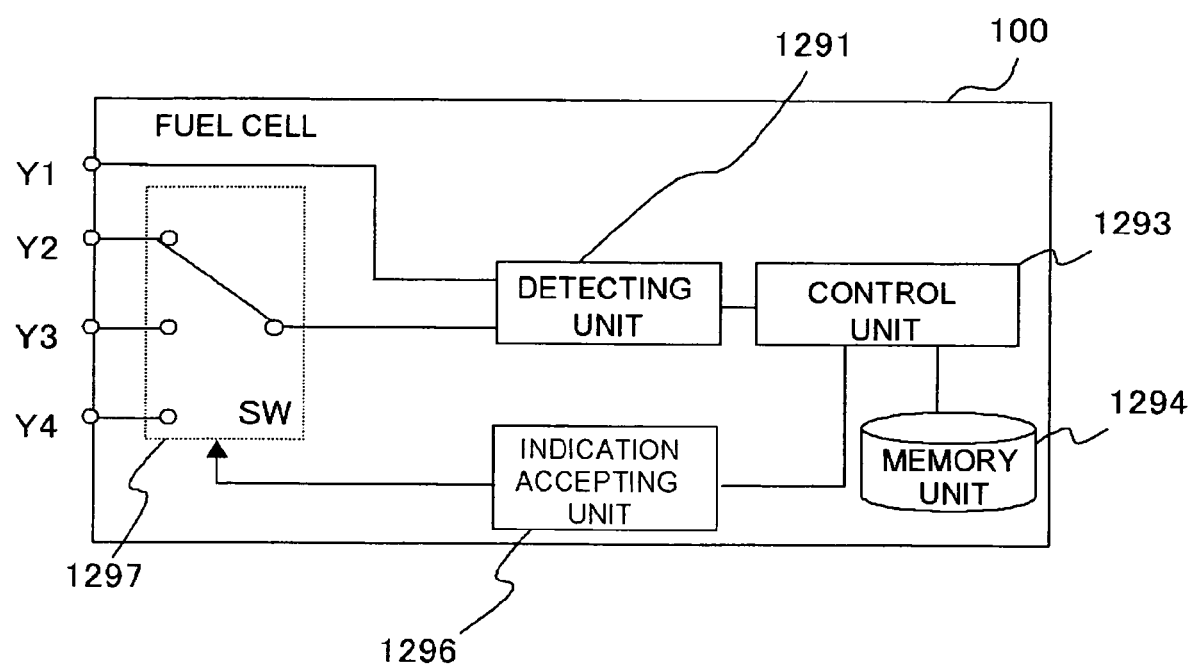
FIG. 24 is a block diagram typically showing another example of the construction of a fuel cell in an embodiment of the present invention.

FIG. 24 is a view showing the fuel cell 100 in this embodiment. In this embodiment, the fuel cell 100 includes, in addition to the structure shown in FIG. 20 explained in the third embodiment, an indication accepting unit 1296 that receives the indication of users as to the selection of the fuel cartridge 1220 to be mounted into the fuel cell 100 and a switch 1297 that switches so as to select any one of the connecting terminals Y2, Y3 and Y4 depending on the type of the fuel cartridge 1220 the information of which is accepted by the indication accepting unit 1296. In this embodiment, the fuel cartridge 1220 has the same structure as that explained in the third embodiment.

Figure 25:
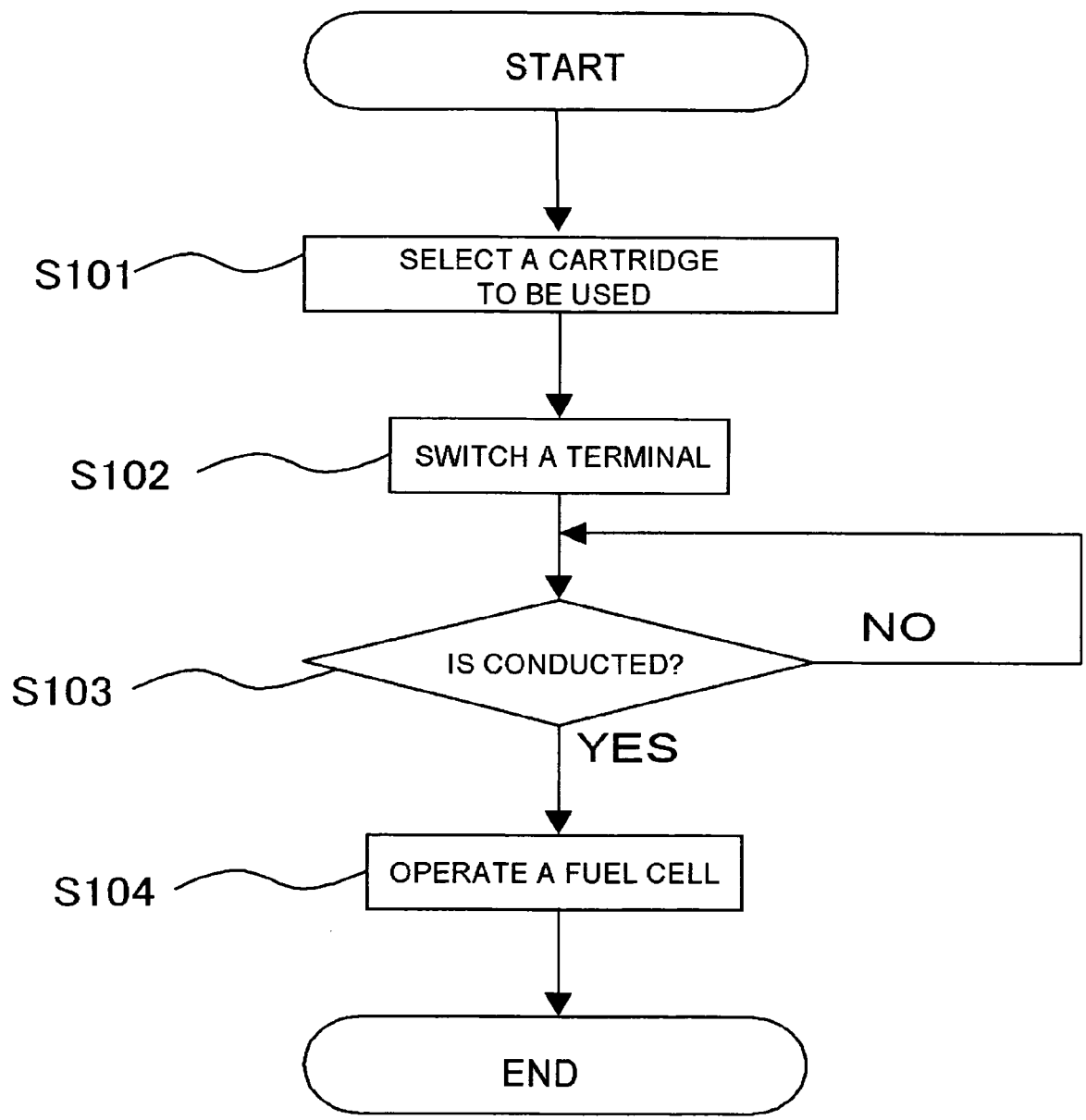
FIG. 25 is a flow chart showing one example of the operating procedures of the fuel cell shown in FIG. 24.

FIG. 25 is a flow chart showing one example of the working procedures of the fuel cell shown in FIG. 24.

The indication accepting unit 1296 accepts the information as to the selection of the type of the fuel cartridge 1220 to be used in the fuel cell 100 from users (step S101). The switch 1297 switches a terminal such that any of the connecting terminals Y2 to Y4 is connected with the detecting unit 1291 depending on the type of the fuel cartridge 1220 selected in the step S101 (step S102). The setting of the fuel cell 100 is finished by this treatment.

When an adequate fuel cartridge 1220 is mounted on the fuel cell 100 in this condition, the detecting unit 1291 detects the conduction between the fuel cartridge 1220 and the connecting terminals Y1 to Y4 (YES in the step S103). This allows the fuel cell 100 to start operating (step S104).

In this embodiment, as mentioned above, the type of the fuel cartridge 1220 which can be mounted on the fuel cell 100 side can be set. It is therefore possible to optionally mount an adequate fuel cartridge 1220 depending on the working environment.

FIFTH EMBODIMENT

Figure 26:
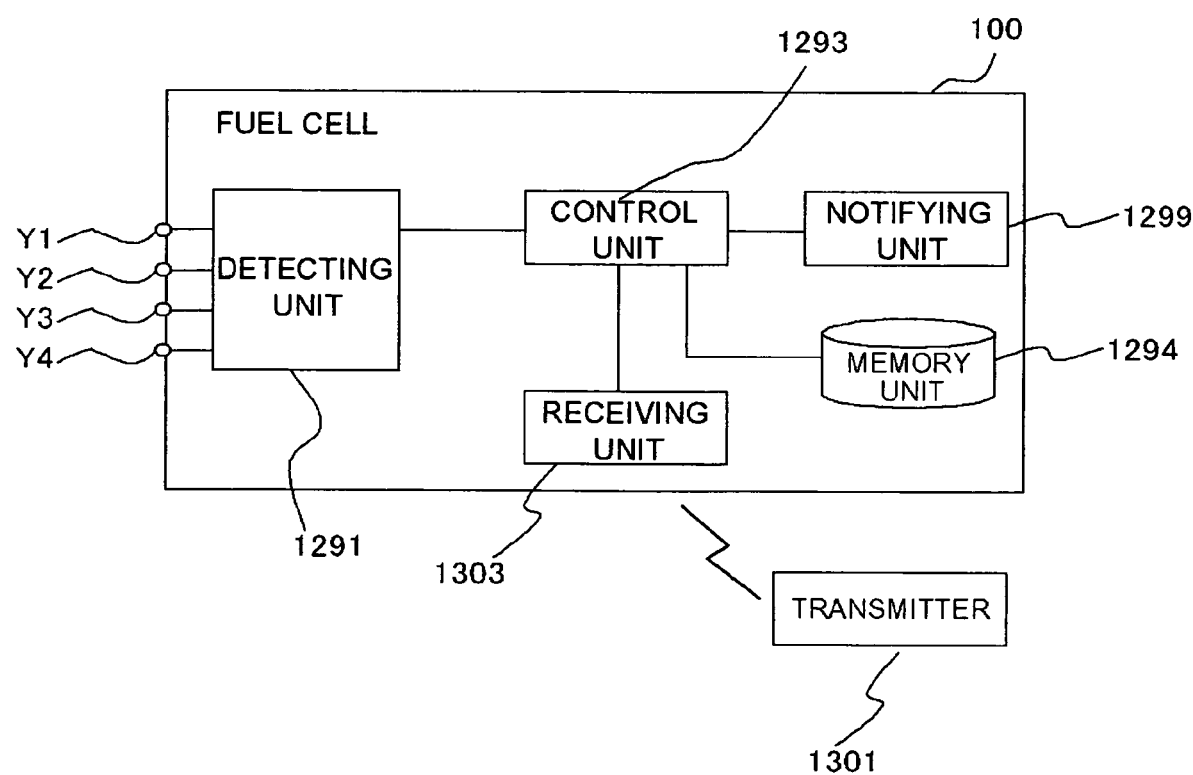
FIG. 26 is a block diagram showing the schematic construction of a fuel cell system in an embodiment of the present invention.

FIG. 26 is a block diagram showing the schematic structure of a fuel cell system in this embodiment.

In this embodiment, the fuel cell system using the fuel cell 100 includes a transmitter 1301 that transmits fuel use regulation information by radio communication when there is some regulations to the type and concentration of the fuel and a receiving unit 1303 that receives the transmitted use regulation information transmitted from the transmitter 1301 by radio communication. The receiving unit 1303 and the transmitter 1301 may transmit or receives information either by radio communication or by wire telecommunication.

Figure 27:
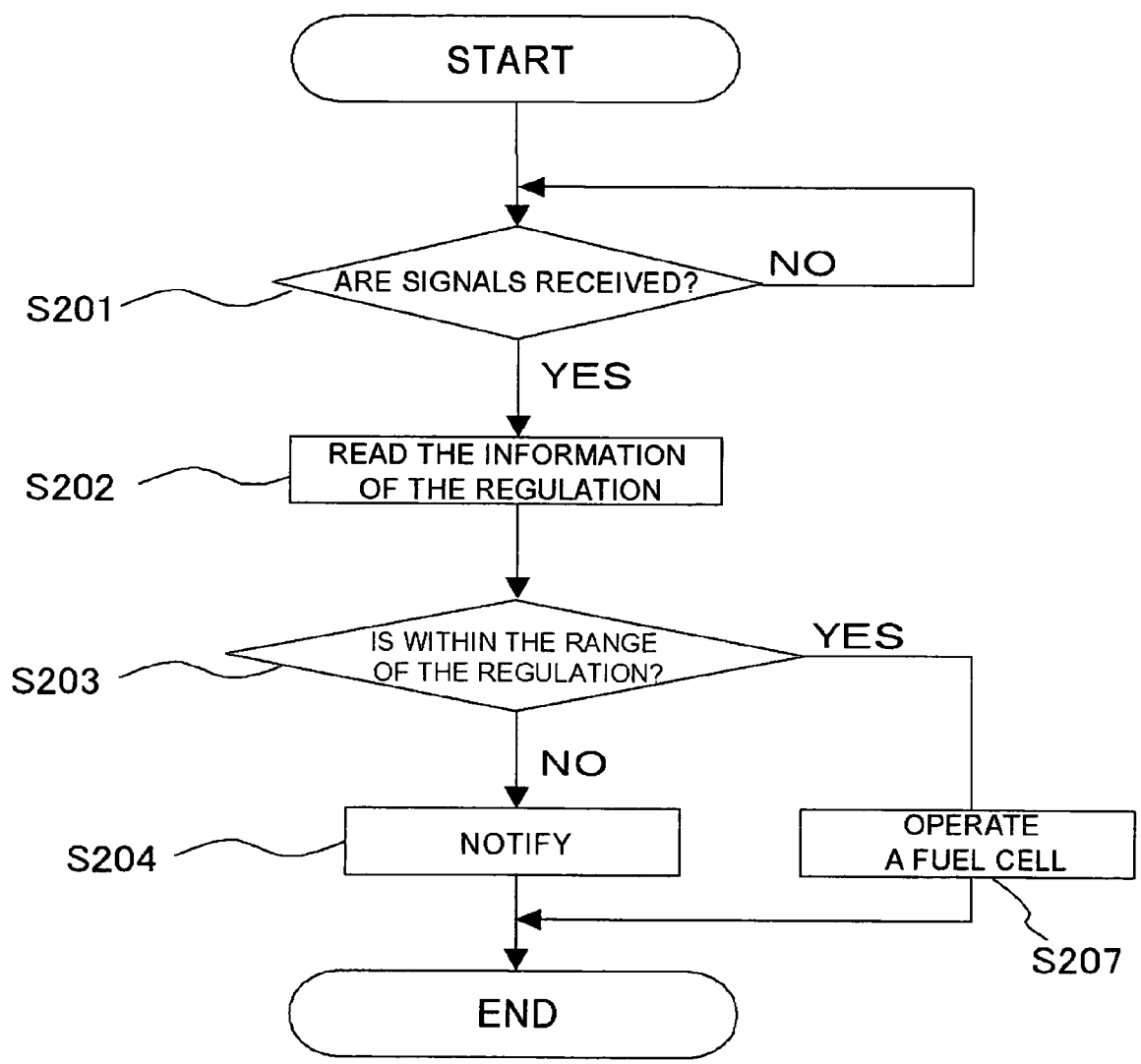
FIG. 27 is a flow chart showing one example of the operating procedures of the fuel cell system shown in FIG. 26.

FIG. 27 is a flow chart showing one example of the working procedures of the fuel cell system in this embodiment.

First, whether the receiving unit 1303 has received signals including use regulation information from the transmitter 1301 or not is judged (step S201). When the receiving unit 1303 has received the signals (YES in the step S201), the use regulation information is read by a control unit 1293 (step S202). The control unit 1293 judges whether the fuel cartridge 1220 mounted at this time is within the range of the regulation or not based on the type of the fuel cartridge 1220 judged based on the information showing electrical connecting condition which has been detected by the detecting unit 1291 and the information of the fuel contained in the cartridge which information is stored in the memory unit 1294, and the use regulation information (step S203). When the fuel cartridge 1220 is within the range of the regulation (YES in the step S203), the operation of the fuel cell is continued (step 207) and then the treatment is finished. When the fuel cartridge 1220 is out of the range of the regulation (NO in the step S203), on the contrary, a user is notified through the notifying unit 1299 that the cartridge is out of the range of the regulation (step S204).

In the fuel cell system constructed in this manner, a user is notified as to whether or not the used fuel cartridge 1220 is within the range of the regulation based on the use regulation information transmitted from the transmitter 1301. It is therefore possible to prevent erroneous use of an inadequate fuel cartridge 1220, enabling an improvement in safety.

Figure 28:
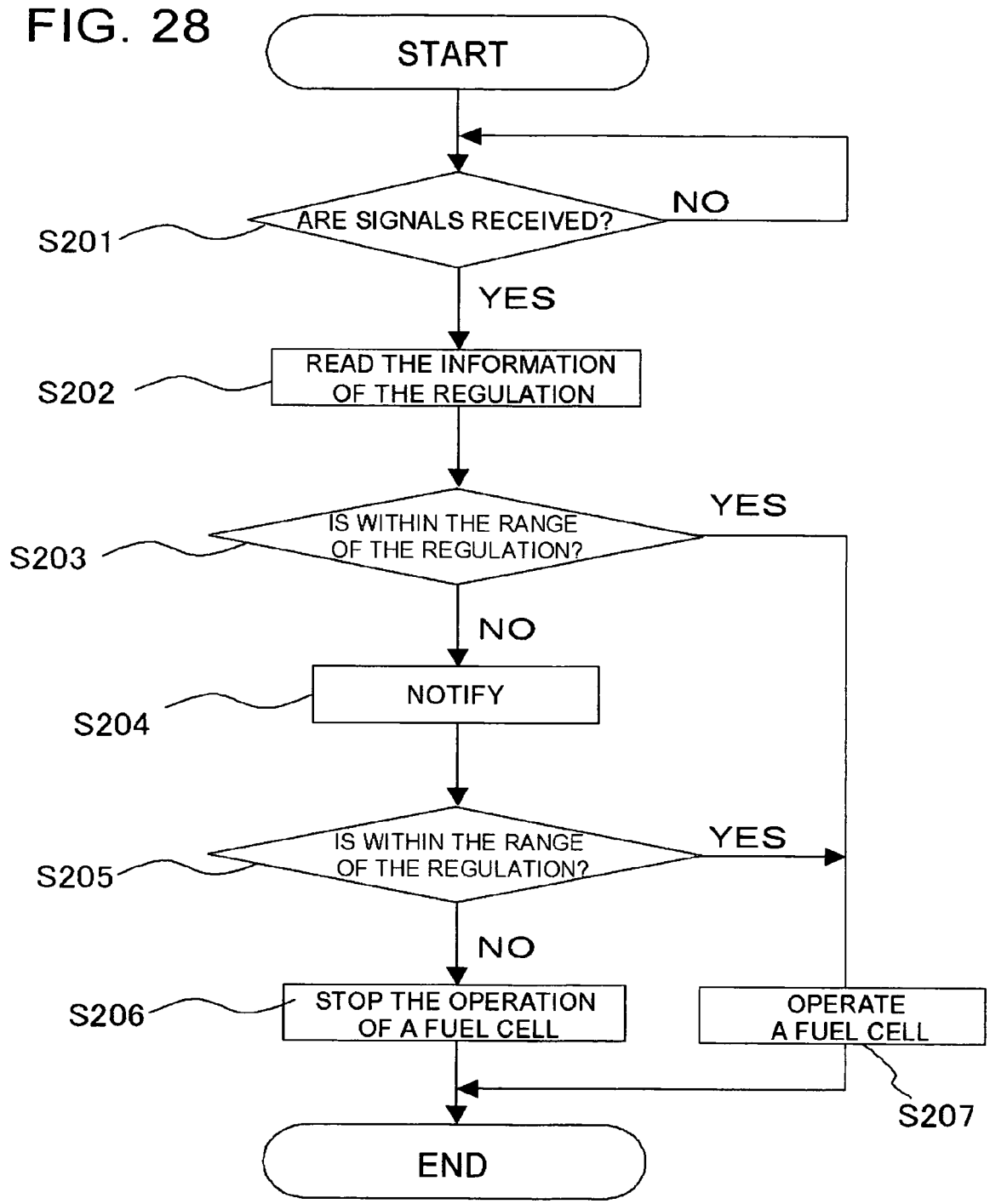
FIG. 28 is a flow chart showing another example of the operating procedures of the fuel cell system shown in FIG. 26.

Furthermore, in other examples, such a process as shown in FIG. 28 may be carried out. Here, the following processes are carried out in addition to the steps S201 to S204 in FIG. 27. Specifically, it is notified that the fuel cartridge 1220 is out of the range of the regulation (S204) After a fixed time passes, whether the fuel cartridge 1220 is within the range of the regulation or not is again judged (step S205). If the fuel cartridge 1220 is out of the range of the regulation (NO in the step S205), the operation of the fuel cell 100 is stopped forcibly by the control unit 1293 (step S206). If the fuel cartridge 1220 is within the range of the regulation in the step 203 or 205, signals are continuously received periodically and the control unit 1293 is made to observe the fuel cell 100 so that the fuel cell 100 can always work within the range of the regulation.

In the fuel cell system constructed in the above manner, the operation of the fuel cell 100 can be stopped forcibly when the fuel is out of the range of the regulation and it is therefore possible to prevent the use of inadequate fuel which possibly causes a dangerous situation, ensuring the safety of the fuel cell 100.

In this embodiment, the fuel cell system may include a battery power source (not shown in the drawings) that supplies a power source to the receiving unit 1303. This ensures that even in the case where the power source of devices using a fuel cell is off, the receiving unit 1303 can be kept in a stand-by state, so that the use regulation information can be received.

In the above embodiment, there are only the descriptions concerning the process in the case of receiving signals of the fuel cartridge 1220 including the use regulation information. However, the fuel cell 100 may be so designed that when the regulation is released, a user is informed of this fact to resume the operation of the fuel cell 100. These processes may be optionally changed by a program or a circuit operating the control unit 1293.

The present invention is thus explained based on the embodiment. These embodiments are strictly illustrative and it is obvious to a person skilled in the art that various modifications are possible and these modifications are also within the scope of the present invention.

Figure 29:
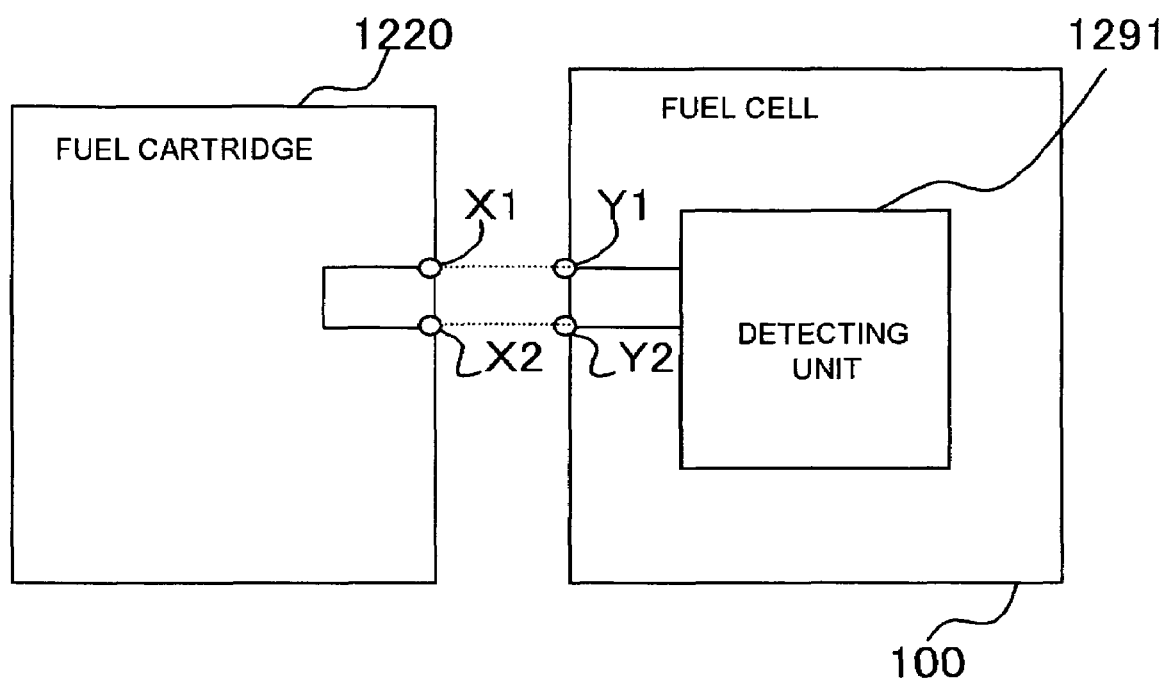
FIG. 29 is a block diagram showing another example of a fuel cell and a fuel cartridge in an embodiment of the present invention.

For example, the fuel cell 100 may have a constitution in which it is electrically conducted only when a predetermined fuel cartridge 1220 is mounted. In the third embodiment, the fuel cell 100 shown in FIG. 20 has the structure provided with the connecting terminals Y1 to Y4. However, as shown in FIG. 29, the fuel cell 100 may have a structure provided with only the connecting terminals Y1 and Y2, wherein the detecting unit 1291 detects whether or not the fuel cartridge 1220 which is to be electrically conducted with the connecting terminals Y1 and Y2 is fitted into the fuel cell 100. In this case, the fuel cell 100 may have a structure provided with neither the control unit 1293 nor the memory unit 1294 and the fuel cell 100 may be so designed that it starts operating when the detecting unit 1291 detects electrical conduction.

Also, for example, in the third embodiment, the electrical connection between the connecting terminals is detected by the detecting unit 1291. However, on the contrary, the fuel cell 100 may have a structure in which the electrical insulation between these connecting terminals is detected by the detecting unit 1291. Also, the fuel cell 100 may have a structure in which plurality of patterns of the electrical connecting condition between plurality of terminals is detected by the detecting unit 1291 to thereby judge which of the fuel cartridges 1220 respectively containing fuels is mounted.

Also, in the third embodiment, the fuel cell 100 is explained on the premise that it has a structure provided with the control unit 1293. However, the fuel cell 100 may be designed to have a structure including circuits such as a switch that starts or stop the operation of the fuel cell 100 based on the information detected by the detecting unit 1291 in place of the control unit 1293.

Also, the indication accepting part 1296 shown in the fourth embodiment may be modified into a structure which includes a receiving unit that receives the process indications from the outside of the fuel cell 100 to accept the indications from the outside like the case of the fuel cell system explained with reference to FIG. 26 in the fifth embodiment. This enables, for example, the setting of the fuel cartridge 1220 which can be mounted on the fuel cell 100 from the outside.

Furthermore, in the above embodiments, the mechanical and electrical methods of identifying a fuel cartridge separately. However, these methods may be utilized by combining them. FIG. 30 is a view showing modifications of the fuel cell 100 and fuel cartridge 1220 shown in FIG. 9. FIG. 30(A) shows a front view of the fuel cartridge 1220 and FIG. 30(B) shows a front view of the fitting part 1205 of the fuel cell 100. FIG. 30(C) is a cross-sectional view along the line A-A of FIG. 30(A) and FIG. 30(D) is a cross-sectional view taken along the line B-B of FIG. 30(B).

The fuel cartridge 1220 is provided with two connecting terminals X1 and X2 which are electrically connected with each other through a connecting line 1289. The surface of the connecting line 1289 is covered with an insulating member. The connecting terminal X1 is disposed on the periphery of a connecting part 1225 on the fitting plane 1226 of the fuel cartridge 1220 and the connecting terminal X2 is disposed on the periphery of the end 1243 of an insertion part 1241 of the connecting part 1225 of the fuel cartridge 1220.

The fuel cell 100 is provided with two connecting terminals Y1 and Y2. The connecting terminal Y1 is disposed on the periphery of the fitting part 1205 on the receiving plane 1215 of the casing 1203 and the connecting terminal Y2 is disposed at a position closer to the bottom part 1255 on the inside surface of the introduction part 1253 of the fitting part 1205.

The connecting terminals X1 and X2 of the fuel cartridge 1220 and the connecting terminals Y1 and Y2 of the fuel cell 100 are disposed at the positions where the connecting terminals X1 and X2 are electrically connected with the connecting terminals Y1 and Y2 respectively when the fuel cartridge 1220 is mounted on the fuel cell 100.

This ensures that when the connecting part 1225 of the fuel cartridge 1220 is exactly fitted into the fitting part 1205 of fuel cell 100, the connecting terminals X1 and X2 of the fuel cartridge 1220 are brought into contact with the connecting terminals Y1 and Y2 of the fuel cell 100 respectively to thereby establish electrical connections. When no adequate fuel cartridge 1220 is mounted, on the other hand, only one of the connecting terminals X1 and X2 of the fuel cartridge 1220 is brought into contact with the connecting terminals of the fuel cell 100 and electrical connection is not accomplished.

Thus, the fuel cell 100 can discriminate an adequate fuel cartridge 1220.

Figure 31:
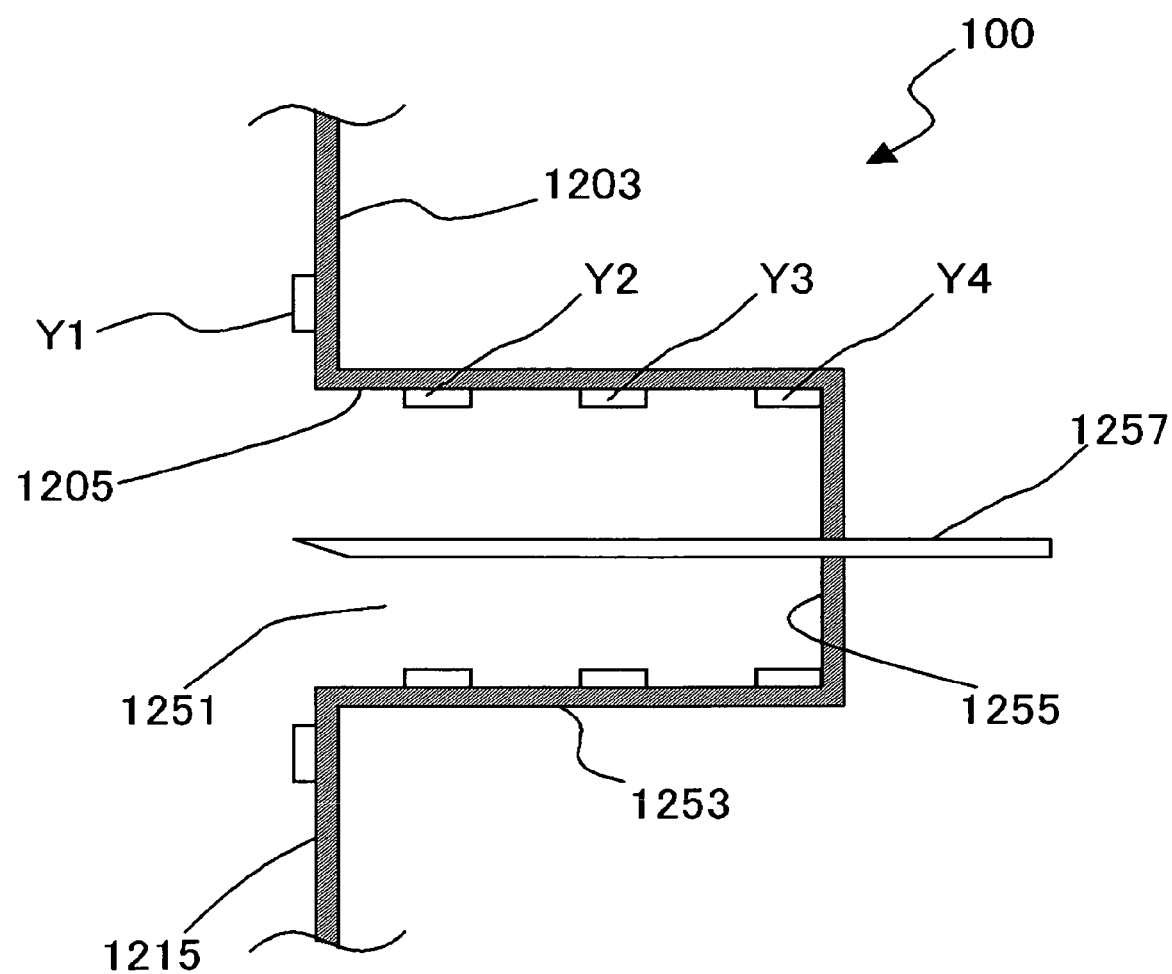
FIG. 31 is a cross-sectional view showing another example of a fuel cell in an embodiment of the present invention.

Also as shown in FIG. 31, the fuel cell 100 may be provided with plurality of connecting terminals Y2, Y3 and Y4 such that these terminals are arranged at predetermined intervals on the inside surface of the introduction part 1253 of the fitting part 1205. At this time, these connecting terminals Y2, Y3 and Y4 are disposed at the positions where they are electrically connectable with the connecting terminals disposed on each end 1243 of the insertion part 1241 of the connecting part 1225 of different fuel cartridges.

The fuel cell 100 has the same structure as the fuel cell 100 shown in FIG. 20, whereby the connecting terminals between which electrical connection is established are detected by the detecting unit 1291 and the information of the connecting terminals is transmitted to the control unit 1293 when the fuel cartridge 1220 is mounted. In the control unit 1293, the type of the fuel cartridge 1220 is identified based on the information showing the electrical connecting condition detected by the detecting unit 1291 and the information of the cartridge which information is stored in the memory unit 1294 and whether or not the identified fuel cartridge 1220 is adequate is judged: the operation of the fuel cell 100 is started when the fuel cartridge 1220 is adequate and stopped when the fuel cartridge 1220 is inadequate.

Also, a structure may be adopted in which a bar code or the like is attached to a fuel cartridge and this bar code is read on the fuel cell side to detect the type of fuel filled in the fuel cell cartridge.

In the above embodiments, the explanations are described taking, as an example, the case where the fuel 124 is an organic liquid fuel. However, the same structures may be used when natural and synthetic gas such as hydrogen, methane, propane, butane or biomass gas is used as the fuel 124.

The invention claimed is:

1. A fuel cell comprising:
a mounting part where a fuel cartridge filled with fuel is mounted in a detachable manner;
an identification part that identifies the fuel cartridge to be mounted on said mounting part,
said identification part comprising a plurality of fitting parts corresponding to a plurality of different fuel cartridges, each fitting part capable of being selectively fitted into at least one of said plurality of different fuel cartridges, and a selecting part that makes usable one fitting part to be selectively fitted into a specified fuel cartridge among said plurality of fitting parts,
wherein said identification part mechanically discriminates by said fitting part whether said mounted fuel cartridge is an adequate fuel cartridge.

2. The fuel cell as set forth in claim 1, wherein said fitting part further comprises:
a detecting unit that detects whether the fitting part is fitted into a fuel cartridge or not,
wherein the detecting unit detects when the fitting part is fitted into the fuel cartridge.

3. The fuel cell as set forth in claim 1, wherein said identification part further comprises:
a terminal connected with the fuel cartridge selectively and electrically.

4. The fuel cell as set forth in claim 1, wherein said identification part further comprises:
a plurality of terminals; and
a selecting part that selects one terminal connected electrically to a specified fuel cartridge from among said plurality of terminals.

5. The fuel cell as set forth in claim 3, the fuel cell further comprising:
a detecting unit that detects whether or not said terminal is electrically connected with said fuel cartridge,
wherein said detecting unit detects that said terminal is electrically connected with said fuel cartridge.

6. The fuel cell as set forth in claim 1, wherein said identification part further comprises:
a plurality of terminals; and
a detecting unit that detects the electrical connecting condition between said plurality of terminals and the fuel cartridge mounted into said mounting part.

7. The fuel cell as set forth in claim 6, wherein said identification part further comprises:
a judging part that judges the type of fuel filled in said fuel cartridge based on the electrical connecting condition between said plurality of terminals and said fuel cartridge; and
a control unit that controls the operation condition depending on the type of fuel judged by said judging part.

8. A fuel cartridge comprising a labeled part that is identified by said identification part of the fuel cell according to claim 1.

9. A fuel cartridge comprising a labeled part that is identified by said identification part of the fuel cell according to claim 3, wherein the fuel cartridge comprises:
a plurality of terminals; and
a selecting part that selects one terminal connected electrically to said terminal of said fuel cartridge from among said plurality of terminals.

10. A fuel cell system comprising:
the fuel cell cartridge of claim 8, the fuel cartridge comprising a labeled part showing a filled fuel; and
a fuel cell body comprising an identification part that identifies said labeled part of said fuel cartridge.

11. The fuel cell as set forth in claim 1, wherein each fitting part further comprises:
a detecting unit that detects whether the fitting part is fitted into a fuel cartridge or not,
wherein the detecting unit detects that the fitting part is fitted into the fuel cartridge.

12. The fuel cell as set forth in claim 4, the fuel cell further comprising:
a detecting unit that detects whether or not said terminal is electrically connected with said specific fuel cartridge,
wherein said detecting unit can work when it detects that said terminal is electrically connected with said fuel cartridge.

13. The fuel cell as set forth in claim 1, wherein the plurality of fitting parts are a plurality of receiving holes corresponding to the plurality of different fuel cartridges and the selecting part is a shutter that opens only one of the receiving holes and shuts the remaining receiving holes.

14. The fuel cell as set forth in claim 13, wherein the position of the shutter is changed by hand or under automatic control.

15. The fuel cell as set forth in claim 1, wherein the fitting part further comprises:
- an introduction part; and
- a mechanism that changes the depth of the introduction part, wherein the depth of the introduction part is changed based on the fuel cartridge selected from the plurality of different fuel cartridges.

16. The fuel cell as set forth in claim 7, the fuel cell further comprising:
- a pump that sucks fuel from the fuel cartridge and circulates the fuel,
- wherein the control unit controls the pump based on the concentration of the fuel contained in the fuel cartridge selected from the plurality of different fuel cartridges.

17. The fuel cell as set forth in claim 1, the identification part further comprising:
- a plurality of connecting terminals; and
- the selected fuel cartridge further comprising at least one connecting terminal, wherein the number of connecting terminals corresponding to the fuel cell is different from the number of connecting terminals corresponding to the selected fuel cartridge.

18. The fuel cell as set forth in claim 17, wherein the number of connecting terminals corresponding to the fuel cell is greater than the number of connecting terminals corresponding to the selected fuel cartridge.

19. A fuel cell comprising:
- a mounting part, wherein a fuel cartridge is mounted in a detachable manner; and
- an identification part that identifies a mounted fuel cartridge mounted on said mounting part, the identification part comprising a plurality of fitting parts corresponding to a plurality of different fuel cartridges and a selecting part that makes usable one fitting part to be selectively fitted into a specified fuel cartridge among said plurality of fitting parts,
- wherein said identification part is configured to mechanically discriminate a plurality of different fuel cartridges from each other and thereby discriminate whether the mounted fuel cartridge is an adequate fuel cartridge.

* * * * *

UNITED STATES PATENT AND TRADEMARK OFFICE
CERTIFICATE OF CORRECTION

PATENT NO. : 7,645,536 B2
APPLICATION NO. : 10/582666
DATED : January 12, 2010
INVENTOR(S) : Akiyama et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 496 days.

Signed and Sealed this

Twenty-eighth Day of December, 2010

David J. Kappos
*Director of the United States Patent and Trademark Office*